United States Patent
Kusaka et al.

(10) Patent No.: US 11,199,469 B2
(45) Date of Patent: Dec. 14, 2021

(54) MONITORING SYSTEM

(71) Applicant: Panasonic Intellectual Property Management Co., Ltd., Osaka (JP)

(72) Inventors: Hiroya Kusaka, Hyogo (JP); Taro Imagawa, Osaka (JP); Akihiro Noda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 399 days.

(21) Appl. No.: 16/357,928

(22) Filed: Mar. 19, 2019

(65) Prior Publication Data
US 2019/0212223 A1 Jul. 11, 2019

Related U.S. Application Data

(63) Continuation of application No. PCT/JP2017/035899, filed on Oct. 3, 2017.

(30) Foreign Application Priority Data

Feb. 28, 2017 (JP) .............................. JP2017-036230

(51) Int. Cl.
*G01M 5/00* (2006.01)
*G01G 19/02* (2006.01)
(Continued)

(52) U.S. Cl.
CPC ........... *G01M 5/0033* (2013.01); *E01C 23/01* (2013.01); *G01B 11/16* (2013.01); *G01G 9/00* (2013.01);
(Continued)

(58) Field of Classification Search
CPC .............................. E01C 23/01; G01M 5/0033
See application file for complete search history.

(56) References Cited

U.S. PATENT DOCUMENTS 10,407,838 B1\* 9/2019 Sylvester ............. G01G 19/022
2011/0267200 A1\* 11/2011 Reynolds ........... G01G 23/3742
340/666

(Continued)

FOREIGN PATENT DOCUMENTS

JP  2003-296876  10/2003
JP  2004-044116   2/2004
(Continued)

OTHER PUBLICATIONS

The Extended European Search Report dated Feb. 17, 2020 for the related European Patent Application No. 17898399.5.
(Continued)

*Primary Examiner* — Eman A Alkafawi
(74) *Attorney, Agent, or Firm* — McDermott Will and Emery LLP

(57) ABSTRACT

A monitoring system includes an axle weight measurer and a state estimator. The axle weight measurer detects a surface displacement of a road from a first captured image obtained by imaging the road when a vehicle passes at a predetermined spot of a structure having the road that the vehicle passes, and calculates an axle weight of the vehicle from the surface displacement and a displacement coefficient of the road. The state estimator generates an axle weight distribution from the axle weight calculated by the axle weight measurer, and estimates a deterioration degree of the structure, using the axle weight distribution.

7 Claims, 22 Drawing Sheets

(51) Int. Cl.
*E01C 23/01* (2006.01)
*G01G 9/00* (2006.01)
*G01B 11/16* (2006.01)
*G01M 11/08* (2006.01)

(52) U.S. Cl.
CPC ........ *G01G 19/022* (2013.01); *G01M 5/0008* (2013.01); *G01M 5/0041* (2013.01); *G01M 11/081* (2013.01)

(56) References Cited

U.S. PATENT DOCUMENTS

| | | | | |
|---|---|---|---|---|
| 2013/0138331 | A1* | 5/2013 | Lynar | G08G 1/042 701/117 |
| 2013/0314273 | A1* | 11/2013 | Kavaler | G01S 13/92 342/90 |
| 2015/0198502 | A1* | 7/2015 | Phares | G01M 5/0041 702/42 |
| 2016/0040984 | A1* | 2/2016 | Byrne | G01B 11/16 348/92 |
| 2017/0098127 | A1 | 4/2017 | Kobayashi | |
| 2018/0045556 | A1 | 2/2018 | Imagawa | |
| 2019/0033189 | A1* | 1/2019 | Coe | G01N 3/32 |

FOREIGN PATENT DOCUMENTS

| | | |
|---|---|---|
| JP | 2015-064274 | 4/2015 |
| JP | 2017-067723 A | 4/2017 |
| JP | 2018-059896 A | 4/2018 |

OTHER PUBLICATIONS

The Extended European Search Report dated Jun. 26, 2020 for the related European Patent Application No. 17898399.5.
International Search Report of PCT application No. PCT/JP2017/035899 dated Jan. 9, 2018.

* cited by examiner

| VEHICLE ID | VEHICLE NO. | AXLE WEIGHT (t) |
|---|---|---|
| 0001 | SHINAGAWA○○ △△-×× | 8.3 |
| 0001 | SHINAGAWA○○ △△-×× | 7.9 |
| 0002 | OSAKA□□ ⊙⊙-☆☆ | 2.8 |
| 0002 | OSAKA□□ ⊙⊙-☆☆ | 2.3 |
| 000X | SHINJYUKU○⊙ □△-×☆ | 4.9 |
| 000X | SHINJYUKU○⊙ □△-×☆ | 5.6 |
| 000X | SHINJYUKU○⊙ □△-×☆ | 7.2 |
| 000Y | KOBE△× ○○-×□ | 9.0 |

| VEHICLE ID | VEHICLE NO. | AXLE WEIGHT (t) |
|---|---|---|
| 0001 | TOKYO○○ △△-×× | 5.0 |
| 0001 | TOKYO○○ △△-×× | 5.0 |
| 0002 | KYOTO□□ ⊙⊙-☆☆ | 8.0 |
| 0002 | KYOTO□□ ⊙⊙-☆☆ | 8.0 |

MONITORING SYSTEM

TECHNICAL FIELD

The present disclosure relates to a monitoring system that monitors a state of a structure to be measured.

BACKGROUND ART

PTL 1 has disclosed a method for predicting a remaining of a bridge. In this method, a current number of passing vehicles by vehicle weight is measured with respect to a bridge to find a fatigue damage degree, and from the current fatigue damage degree, a future progress of fatigue damage with respect to the bridge is estimated. On the other hand, change in a number of vehicles by vehicle weight in a future traffic volume occurring in the bridge is estimated on a basis of a future city plan around the bridge. Change in the fatigue damage degree occurring by change in the future traffic volume is reflected on the future progress of the fatigue damage estimated in advance, whereby a predicted value of the future progress of the fatigue damage is corrected. The remaining life of the bridge is then predicted from the corrected future progress of the fatigue damage.

CITATION LIST

Patent Literature

PTL 1: Unexamined Japanese Patent Publication No. 2004-44116

SUMMARY

The present disclosure provides a monitoring system that estimates a deterioration state of a structure from a captured image obtained by imaging the structure.

The monitoring system in the present disclosure includes an axle weight measurer and a state estimator. The axle weight measurer detects a surface displacement of road from a first captured image obtained by imaging the road when a vehicle passes at a predetermined spot of a structure having the road that the vehicle passes, and calculates an axle weight of the vehicle from the surface displacement and a displacement coefficient of the road. The state estimator generates an axle weight distribution from the axle weight calculated by the axle weight measurer, and estimates a deterioration degree of the structure, using the axle weight distribution.

A monitoring system in the present disclosure can estimate a deterioration state of a structure from a captured image obtained by imaging the structure.

DESCRIPTION OF EMBODIMENTS

In the present disclosure, a monitoring system will be described that estimates a state such as deterioration, abnormality, or the like occurring due to travelling of a vehicle on a structure in the structure having a road for the vehicle (e.g., infrastructure such as a road bridge, a highway, and a pavement road). In the present disclosure, the road is also included in the structure.

Hereinafter, exemplary embodiments will be described in detail with reference to the drawings as necessary. It is noted that a more detailed description than necessary may be omitted. For example, a detailed description of a well-known item and a duplicated description of substantially the same configuration will be omitted in some cases. This is to avoid an unnecessarily redundant description below and to facilitate understanding of those skilled in the art.

It should be noted that the attached drawings and the following description are provided for those skilled in the art to fully understand the present disclosure, and are not intended to limit the subject matter as described in the appended claims.

First Exemplary Embodiment

[1-1. Accumulative Damage Rule]

Generally, as a way of thinking to evaluate deterioration or a fatigue damage degree of a bridge, there is an accumulative damage rule.

Figure 1:
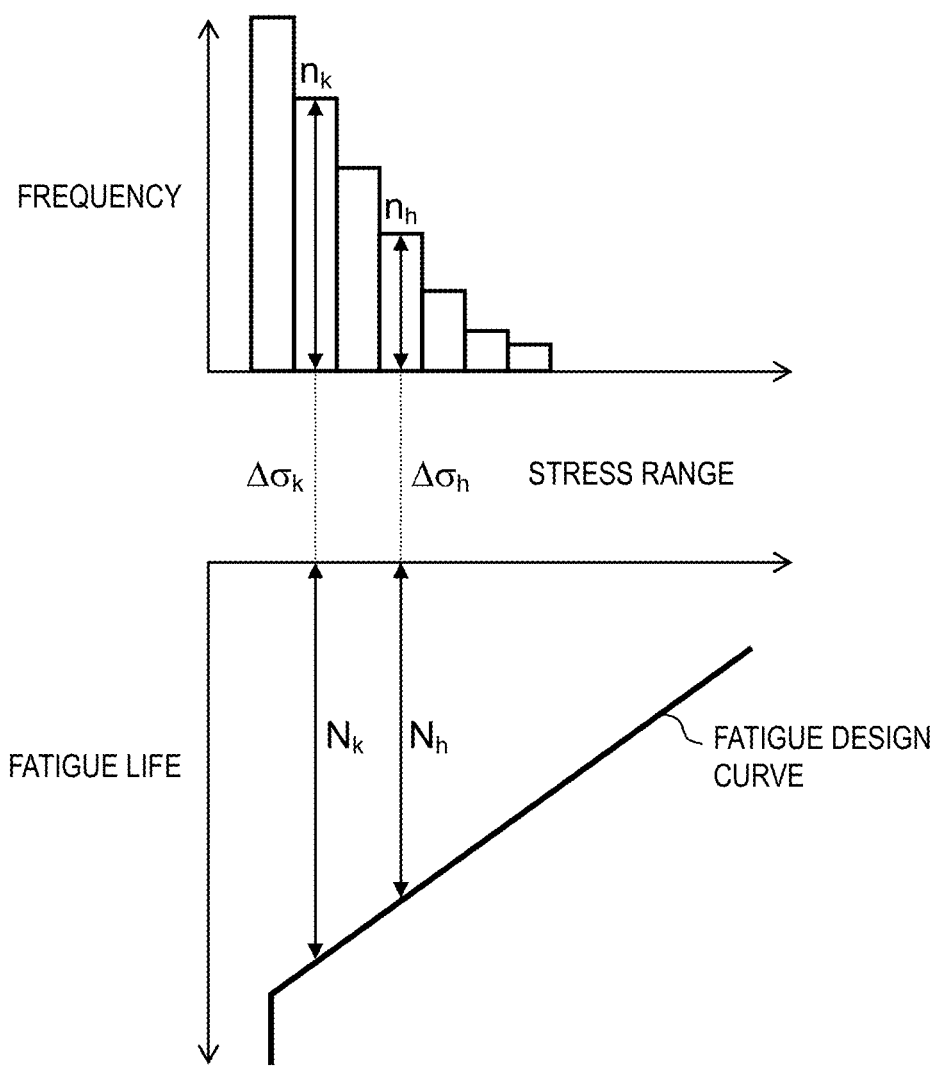
FIG. 1 is a diagram for describing an accumulative damage rule.

FIG. 1 is a diagram for describing the accumulative damage rule. FIG. 1 shows a relationship between a frequency of a stress range and a fatigue life. The total damage rule can be considered as follows. When deterioration or fatigue damage occurs in a member Nk times with respect to stress range $\Delta \sigma k$ applied to the member, an extent of the fatigue damage by applying stress range $\Delta \sigma k$ once is considered to be 1/Nk. Further, it is considered that in a state where various stresses are applied, the fatigue damage occurs at a time point when an integrated value of the stresses reaches fatigue damage condition Z. At this time, fatigue damage condition Z is represented by expression 1.

$$n1/N1+n2/N2+ \ldots nh/Nh+ \ldots nk/Nk+ \ldots \geq Z \quad \text{[Expression 1]}$$

Expression 1 indicates that fatigue damage condition Z accumulated in the member can be represented by a linear sum of respective fatigue damages n1/N1, n2/N2, . . . .

For example, normally, when a bridge is designed, after safety is considered on a basis of predicted values of weights and a number of vehicles passing on the bridge, fatigue design is performed. A stress degree can be found from a load applied to the bridge experimentally or analytically, and on a basis of this, the stress range due to the load applied to the bridge by passing of the vehicle, and an accumulated value thereof can be found. From these stress range and accumulated value, an extent of deterioration or fatigue damage can be estimated on a basis of the idea of the accumulative damage rule.

However, the load applied when the vehicle passes on the bridge is, in actuality, an axle weight per axle instead of a weight of the whole vehicle, because the vehicle has a plurality of axles. Furthermore, it has been known that when a member of the bridge is a steel member, the fatigue damage by the load is a third power of the applied stress range and a first power of a number of times of repeating. For example, as compared with a case where an axle weight of 10 tons is applied, the stress range in a case where an axle weight of 15 tons is applied corresponds to 3.375 times from $(15/1.0)^3=3.375$.

Accordingly, in a vehicle in which a number of axles is two, and a whole weight is 20 tons, the fatigue damage degree imparting the bridge differs between a case where the axle weight is 10 tons in each of the axles, and a case where the axle weight is 5 tons and 15 tons in the respective axles. From this, if the stress by the load is uniformly replaced by the stress range based on the total weight of the vehicle to perform the evaluation by the accumulative damage rule, an error will occur in an estimated value of the fatigue damage degree.

Consequently, the monitoring system of the present disclosure measures the axle weight of the vehicle passing on the bridge, and evaluates the fatigue damage degree on a basis of the accumulative damage rule by using the stress range corresponding to the axle weight.

[1-2. Configuration]

[1-2-1. Monitoring System]

Figure 2:
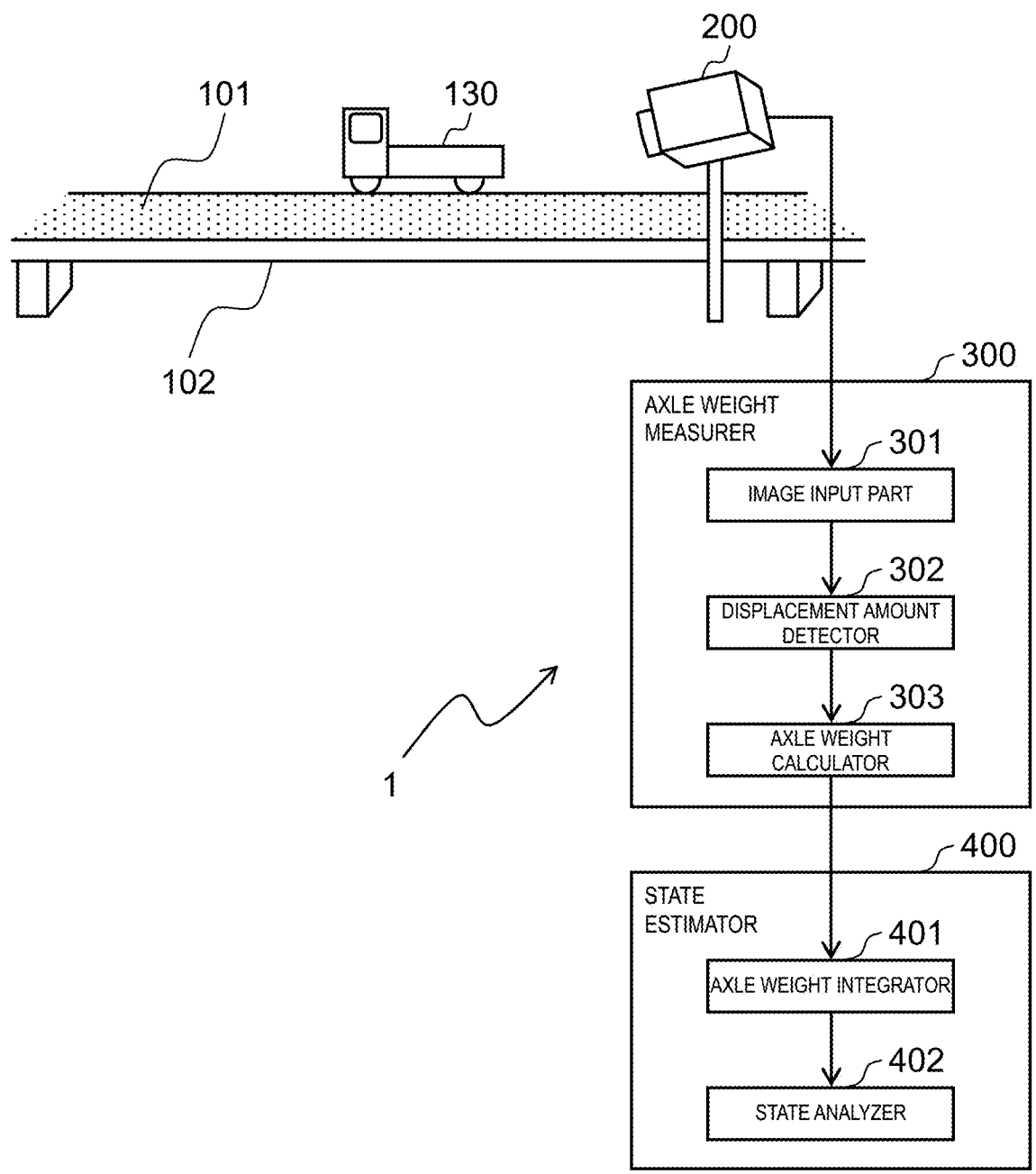
FIG. 2 is a schematic diagram showing a whole configuration of a monitoring system according to a first exemplary embodiment.

FIG. 2 is a schematic diagram showing a configuration of a monitoring system according to a first exemplary embodiment.

As shown in FIG. 2, monitoring system 1 according to the first exemplary embodiment is configured of imaging device 200, axle weight measurer 300, and state estimator 400. Monitoring system 1 monitors a state of a structure having road 101 where vehicle 130 travels. In the first exemplary embodiment, a case will be described as one example, where road 101 is an asphalt road surface, and the structure is bridge 102.

Imaging device 200 images road 101 as an imaging object at a time point when vehicle 130 passes. Imaging device 200 is installed by deciding a direction beforehand so as to image a spot that each wheel of vehicle 130 frequently pass on road 101. Axle weight measurer 300 measures a load (an axle weight) of each axle of traveling vehicle 130, using an captured image that imaging device 200 has captured. State estimator 400 estimates a state of bridge 102 on a basis of the axle weight measured by axle weight measurer 300.

[1-2-2. Axle Weight Measurer]

As shown in FIG. 2, axle weight measurer 300 includes image input part 301, displacement amount detector 302, and axle weight calculator 303.

Axle weight measurer 300 is implemented, for example, in such a way that in a computer (not shown) including a microprocessor and a memory (not shown), the microprocessor executes a program stored in the memory.

Image input part 301 receives an input of the captured image that imaging device 200 captures. Here, for example, image input part 301 receives an input of a digital image of 4096×2160 pixels. Moreover, the captured image is input through wireless or wired communication or through a recording medium.

By using the captured image obtained by imaging road 101 when the vehicle passes and received by image input part 301, displacement amount detector 302 detects a displacement amount in the captured image corresponding to a displacement caused near a surface of road. 101 by the axle weight applied to road 101 by the vehicle traveling.

In other words, displacement amount detector 302 compares a captured image in which no displacement is caused in road 101 and a captured image in which a displacement is caused in road 101 among the plurality of captured images received by image input part 301 to thereby detect a displacement amount. The detection of the displacement amount between the images can be implemented by using block matching, a correlation method, or an optical flow. For example, this displacement amount is calculated as a pixel number indicating a difference in pixel position corresponding to an identical spot on road. 101 between the images as comparative objects. Moreover, the captured image in which no displacement is caused may be a captured image that has been captured beforehand with a load object absent, a captured image in which an image change amount is lower than or equal to a certain level among a plurality of captured images that are captured temporally continuously, or a captured image determined not to include any load object as a result of image recognition processing.

Axle weight calculator 303 calculates the axle weight of the passing vehicle from the displacement amount of road 101 detected by displacement amount detector 302. More specifically, axle weight calculator 303 calculates the axle weight, using a relational expression representing a relationship between the axle weight and the displacement amount, and a displacement coefficient as a coefficient used in this relational expression, in the case where the displacement is caused in road 101 due to the application of the axle weight of each wheel to road 101. Axle weight calculator 303 stores the relational expression and the displacement coefficient beforehand.

In general, axle weight w (kg) is represented by an expression of w=f(d) as function f with respect to displacement amount d (pixel number). In the present disclosure, function f is handled after being approximated with a linear function. Axle weight calculator 303 stores linear function w=$\alpha$d as a relational expression, where a variable is represented by d, and the displacement coefficient is represented by $\alpha$.

This displacement coefficient $\alpha$ differs, depending on a type and a composition of asphalt or the like configuring road 101. vehicles whose axle weight are known are caused to travel on road 101 to survey the relationship between the axle weight and the displacement amount of road 101 when the vehicles travels to thereby decide displacement coefficient $\alpha$ in advance, and store the same in axle weight calculator 303. When detecting the displacement amount of road 101, displacement amount detector 302 converts the displacement amount into the axle weight of the passing vehicle to output the converted axle weight to state estimator 400.

[1-2-3. State Estimator]

As shown in FIG. 2, state estimator 400 includes axle weight integrator 401 and state analyzer 402.

State estimator 400 is implemented, for example, in such a way that in a computer (not shown) including a microprocessor and a memory (not shown), the microprocessor executes a program stored in the memory.

Axle weight integrator 401 classifies the axle weight calculated by axle weight calculator 303 by magnitude. For example, axle weight integrator 401 classifies the axle weight obtained from axle weight calculator 303 by bin with a width of 1 bin as 1 ton, and generates a histogram (an axle weight distribution) of the axle weight.

State analyzer 402 analyzes the axle weight distribution generated by axle weight integrator 401, and analyzes a state of bridge 102 having road 101 (particularly, a state of influence by the axle weight applied from vehicle 130). State estimator 400 estimates a deterioration degree of bridge 102 from the state of bridge 102, and further determines necessity of repairing of bridge 102 and a repairing time of the repairing from the deterioration degree of bridge 102.

Operation performed by monitoring system 1 having the above-described configuration will be described with reference to the drawings hereafter.

[1-3. Operation]

Figure 3:
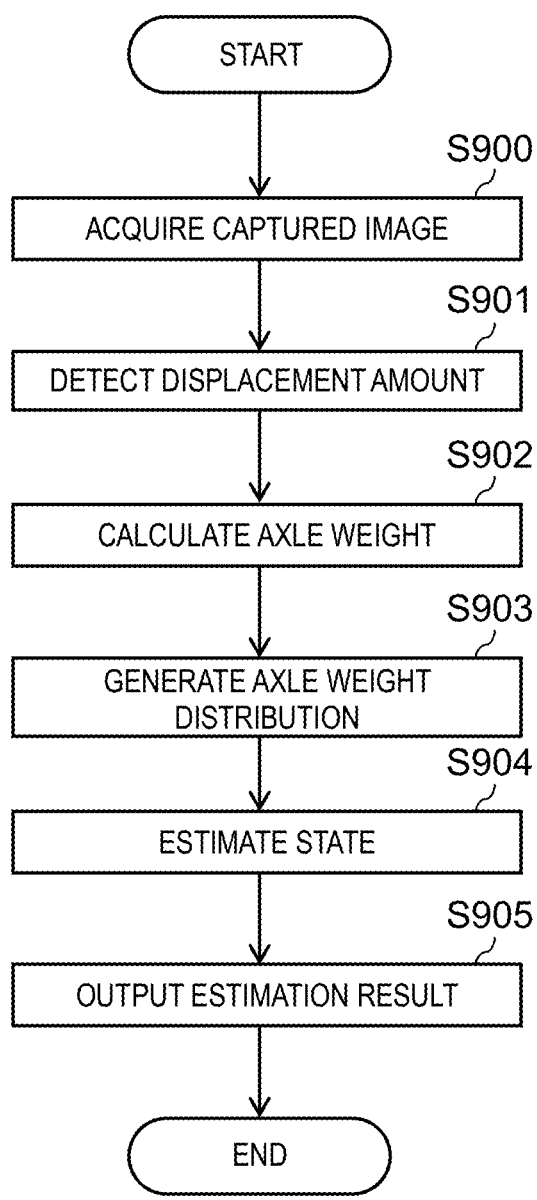
FIG. 3 is a flowchart for describing operation of the monitoring system according to the first exemplary embodiment.

FIG. 3 is a flowchart for describing the operation of monitoring system 1 according to the first exemplary embodiment.

Imaging device 200 is installed in a predetermined position and direction, and continues to capture the image of road 101. Imaging device 200 outputs the captured image to axle weight measurer 300. That is, axle weight measurer 300 acquires the captured image (step S900). Image input part 301 outputs the captured image output from imaging device 200 to displacement amount detector 302.

Displacement amount detector 302 compares the capture image in which no displacement is caused in road 101 (hereinafter, referred to as "captured image B"), and the capture image output from image input part 301 to detect the displacement amount of road 101 (step S901). If image input part 301 has not acquired captured image B, displacement amount detector 302 waits until captured image B is acquired by image input part 301, and then, detects this displacement amount. Image input part 301 may acquire captured image B beforehand. When having detected that the displacement amount is caused in road 101, displacement amount detector 302 outputs the displacement amount to axle weight calculator 303.

Axle weight calculator 303 calculates the axle weight of vehicle 130 that has caused the displacement from the displacement amount detected by displacement amount detector 302 (step S902).

Figure 4:
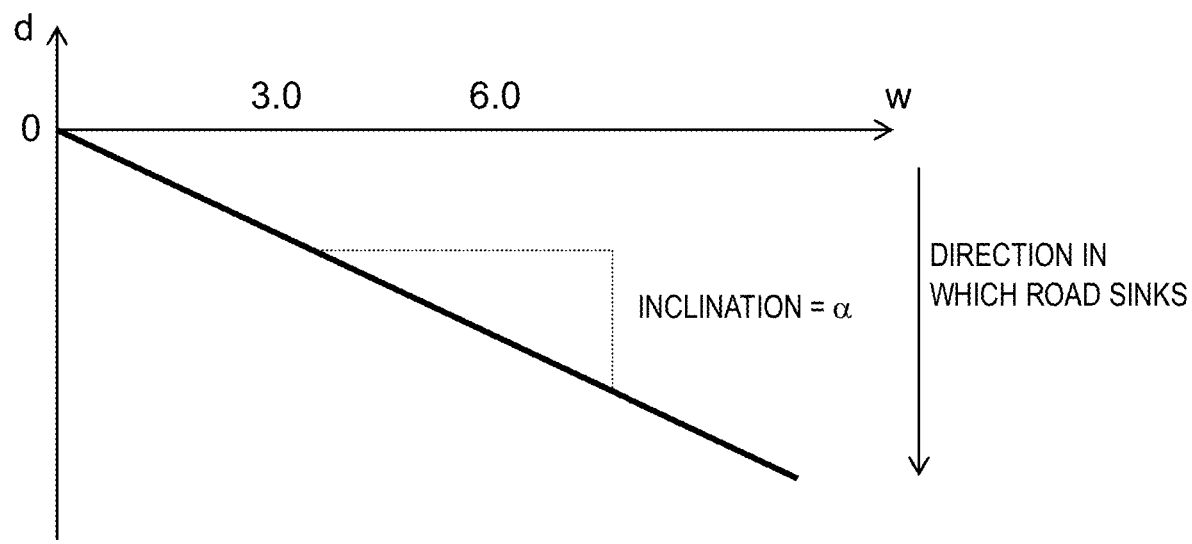
FIG. 4 is a diagram for describing a relationship between a displacement amount of a road, and an axle weight.

FIG. 4 is a diagram for describing a relationship between the displacement amount of the road, and the axle weight.

FIG. 4 shows, in a graph, linear function w=$\alpha$d used when axle weight calculator 303 converts the displacement amount into the axle weight. Here, w is an axle weight, d is a displacement amount, and $\alpha$ is a displacement coefficient indicating an inclination. Moreover, in FIG. 4, a horizontal axis indicates the axle weight, and a vertical axis indicates the displacement amount (pixel number). FIG. 4 shows that as the displacement amount indicates a minus value, road 101 sinks due to the axle weight of vehicle 130.

Axle weight calculator 303 stores linear function w=$\alpha$d beforehand, and calculates the axle weight of vehicle 130 from the displacement amount detected by displacement amount detector 302, using this linear function. A method for calculating the axle weight from the displacement amount of road 101 is not limited to the method of using the linear function. For example, a table indicating the relationship between the displacement amount and the axle weight is stored beforehand, and the displacement amount is converted into the axle weight, using the table. Axle weight calculator 303 outputs the calculated axle weight to state estimator 400.

In state estimator 400, axle weight integrator 401 classifies the axle weight output from axle weight measurer 300, for example, by bin having a certain width to generate the axle weight distribution (step S903).

Figure 5:
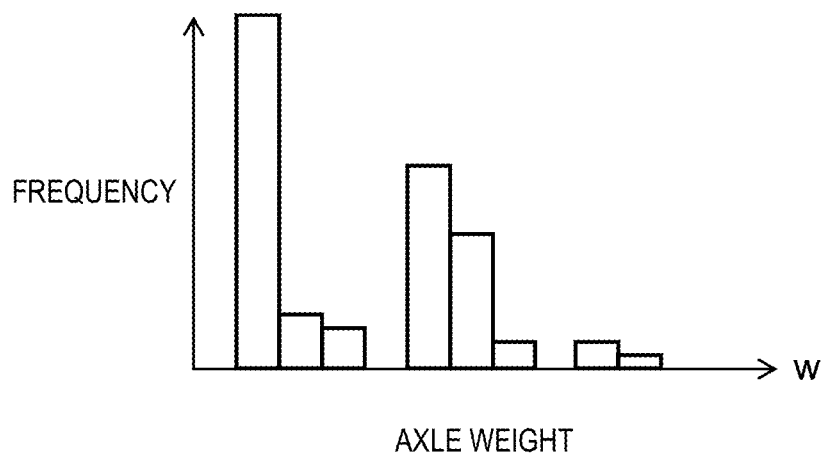
FIG. 5 is a diagram showing one example of an axle weight distribution generated by an axle weight integrator.

FIG. 5 is a diagram showing one example of the axle weight distribution generated by axle weight integrator 401. As shown in the axle weight distribution of FIG. 5, a horizontal axis indicates the axle weight and a vertical axis indicates a frequency of the axle weight.

State analyzer 402 estimates the state of bridge 102 from the axle weight distribution obtained in axle weight integrator 401. State analyzer 402 calculates a fatigue life of bridge 102, using the accumulative damage rule shown in FIG. 1. State analyzer 402 estimates the state such as a deterioration or fatigue damage degrees from the calculated fatigue life (step S904). State analyzer 402 includes, for example, a table in which the fatigue life and the extent of the deterioration or the fatigue damage are associated with an inspection time, necessity of repairing, and a repairing time of the repairing. State analyzer 402 extracts the extent of the fatigue damage of bridge 102, the inspection time, the necessity of repairing, and the repairing time of the repairing from the table and the calculated fatigue life, and outputs an extracted result as an estimation result (step S905).

[1-4. Effects and the Like]

Monitoring system 1 of the present disclosure includes axle weight measurer 300 and state estimator 400. Axle weight measurer 300 detects the displacement amount (road surface displacement) of road 101 from the captured image (a first captured image) obtained by imaging road 101 when vehicle 130 passes at a predetermined spot of bridge 102 having road 101 that vehicle 130 passes, and calculates the axle weight of vehicle 130 from the displacement amount and the displacement coefficient. State estimator 400 generates the axle weight distribution from the axle weight calculated by axle weight measurer 300, and estimates the deterioration degree of bridge 102, using the axle weight distribution.

Thereby, the fatigue damage degree of bridge 102 can be estimated on a basis of the accumulative damage rule from the captured image obtained by imaging road 101 that vehicle 130 passes. Accordingly, various types of measurers and the like are not installed in order to accurately estimate the extent of the deterioration or the fatigue damage of bridge 102, so that costs and labor can be reduced.

While in the first exemplary embodiment, as an example, the accumulative damage rule has been described as a technique for evaluating the deterioration or fatigue damage degree of bridge 102, the evaluation technique is not limited thereto. Another technique for estimating the deterioration or the fatigue damage on a basis of a load applied to bridge 102 may be used. Obviously, in the other technique, the method of utilizing the axle weight described in the present exemplary embodiment is also effective.

Moreover, while the example of the steel member has been described for the influence on the fatigue damage by magnitude of the axle weight, a member whose fatigue damage is to be evaluated is not limited thereto. Obviously, the method of utilizing the axle weight described in the present exemplary embodiment is also effective to the evaluation of another member, for example, a floor slab of a road bridge or the like.

Moreover, while in the first exemplary embodiment, the relational expression between the displacement amount and the axle weight is represented by the linear function, for example, the relational expression may be represented by a quadratic or higher-order function.

Moreover, while in the first exemplary embodiment, the method of deciding displacement coefficient α beforehand, using the vehicles whose axle weight are known has been described, the decision method is not limited thereto. Displacement coefficient α may be decided in advance, for example, by an analysis method of applying a multilayer elasticity theory, or simulation. Alternatively, a result from decision in another road of another structure near road 101 may be diverted to displacement coefficient α.

Second Exemplary Embodiment

In a second exemplary embodiment, a case will be described where a displacement amount detector detects a road surface displacement from a captured image of a region in a specific range in road 101 of an captured image. A monitoring system of the second exemplary embodiment is different from monitoring system 1 of the first exemplary embodiment in a configuration of an axle weight measurer, and thus, the axle weight measurer will mainly be described with reference to the drawings.

[2-1. Configuration]

Figure 6:
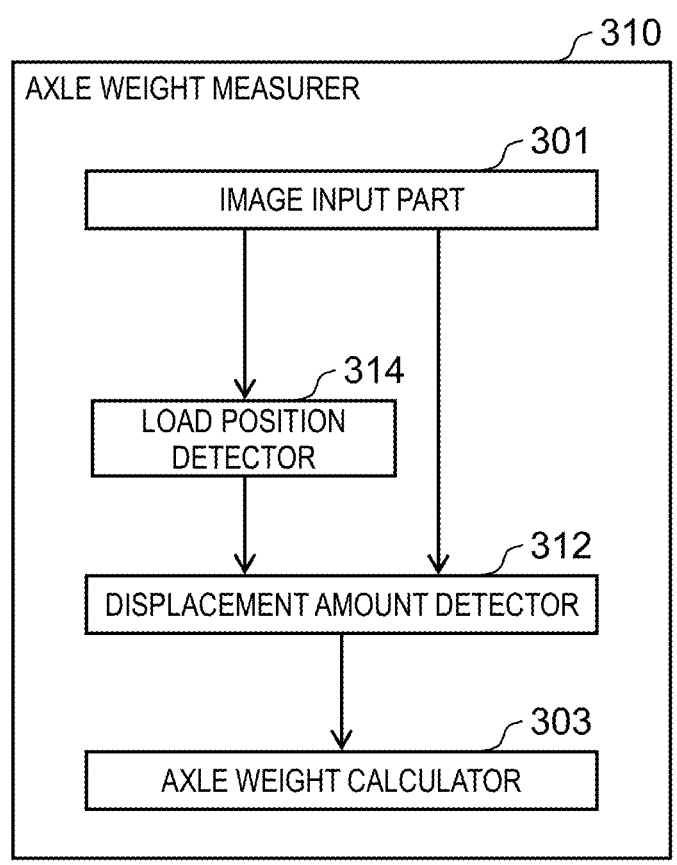
FIG. 6 is a block diagram showing a configuration of an axle weight measurer in a second exemplary embodiment.

FIG. 6 is a block diagram showing a configuration of axle weight measurer 310 in the second exemplary embodiment. In FIG. 6, components that perform the same operations to those of axle weight measurer 300 of the first exemplary embodiment (see FIG. 2) are given the same reference marks, and description thereof is omitted.

As shown in FIG. 6, axle weight measurer 310 is configured such that some functions are changed from axle weight measurer 300 in the first exemplary embodiment (see FIG. 2). Specifically, load position detector 314 is added, and further, with this addition, displacement amount detector 302 is newly changed to displacement amount detector 312. Therefore, load position detector 314 and displacement amount detector 312 will mainly be described here.

Load position detector 314 detects each wheel portion of vehicle 130 from a plurality of captured images obtained by imaging road 101 of vehicle 130, and outputs coordinates on each of the captured images in a region close to the relevant wheel in road 101.

On a basis of the coordinates output from load position detector 314, displacement amount detector 312 compares a captured image in which no displacement is caused in the specific region inside road 101 and a captured image in which a displacement is caused in the specific region inside road 101 among the plurality of captured images received by image input part 301. This allows displacement amount detector 312 to detect the displacement amount.

[2-2. Operation]

Figure 7:
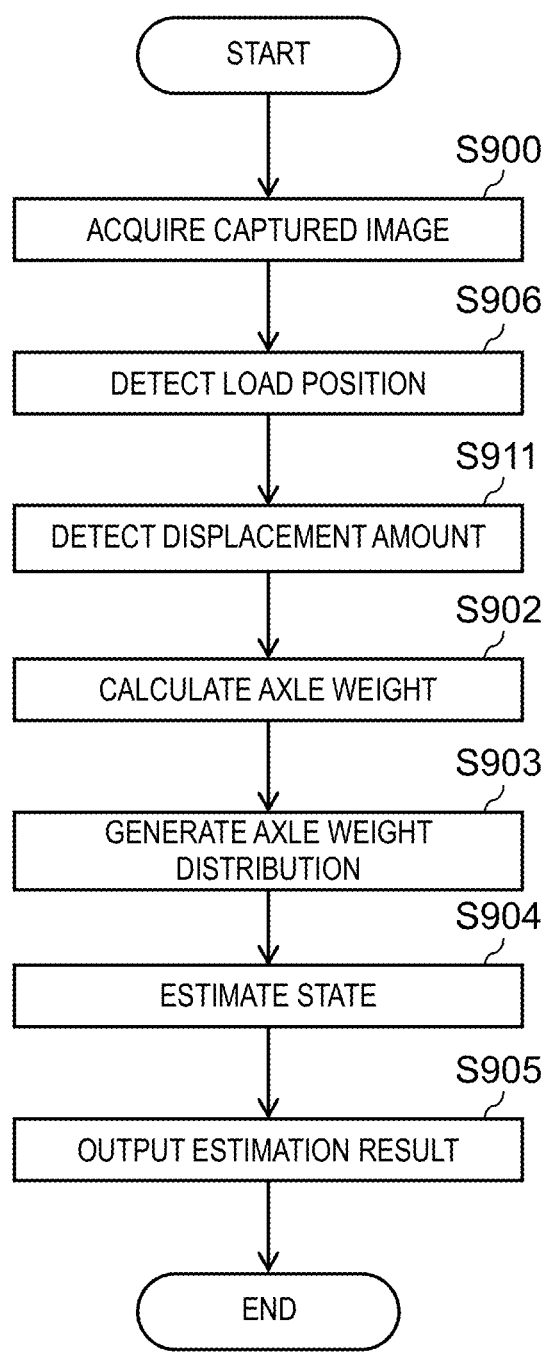
FIG. 7 is a flowchart for describing operation of a monitoring system according to the second exemplary embodiment.

FIG. 7 is a flowchart for describing operation of the monitoring system according to the second exemplary embodiment. In FIG. 7, steps of performing the same operations to those in the flowchart of FIG. 3 are given the same reference marks and description thereof is omitted.

Load position detector 314 detects, by image processing, the portion corresponding to each of the wheels of vehicle 130 inside the plurality of captured images received by image input part 301. As a method for detecting the wheel, a method of detecting the wheel by template matching may be used. In the template matching, a template matching a shape of the wheel is stored in load position detector 314 beforehand, and the template and the captured images are compared. A method may be used, in which a fact that the shape of the wheel is circular may be utilized to search for a circular object from an inside of each of the images. Moreover, a method of causing pictures of a number of wheels to be learned by machine learning in advance, and detecting each of the wheels from the image by artificial intelligence, or the like may be used. After detecting the wheel, load position detector 314 detects coordinates on the image of a portion where the wheel and road 101 come into contact with each other. That is, load position detector 314 detects a load position inside the captured image (step S906).

Figure 8:
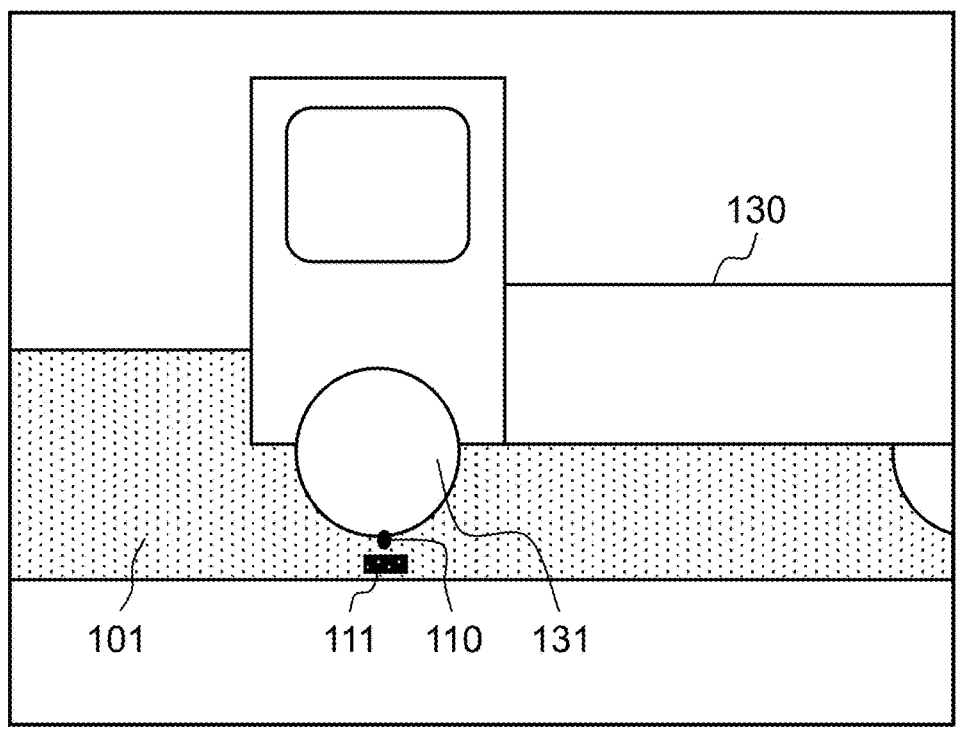
FIG. 8 is a diagram for describing one example of a region where a displacement amount in a captured image is detected.
Figure 9:
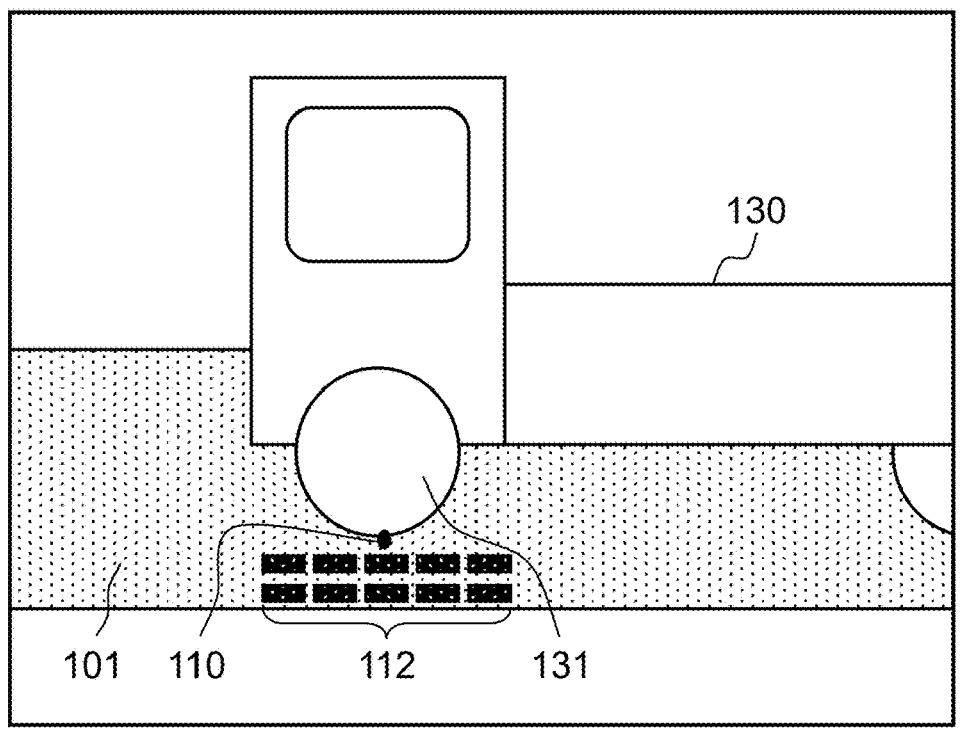
FIG. 9 is a diagram for describing another example of the region where the displacement amount in the captured image is detected.

FIG. 8 is a diagram for describing one example of the region where the displacement amount in the captured image is detected. FIG. 9 is a diagram for describing another example of the region where the displacement amount is detected in the captured image.

As shown in FIG. 8, it is assumed that imaging device 200 is installed so as to obtain the captured image with road 101 on a lower side of the image. After detecting wheel 131, as a position where wheel 131 and road 101 come into contact with each other, load position detector 314 sets a spot 110 where an axis passing a substantially center of wheel 131 comes into contact with a region of road 101. Load position detector 314 finds coordinates on the image of this position to output the same.

Displacement amount detector 312 detects the displacement amount of road 101 from the specific region on the captured image set on a basis of the coordinates output from load position detector 314. (step S911). For example, displacement amount detector 312 may provide, as a region where the displacement amount is detected, the specific region directly under spot 110 or in a vicinity thereof, for example, region 111 in FIG. 8. Moreover, as shown in FIG. 9, displacement amount detector 312 may provide specific regions in a range in a lower direction of spot 110 such as a plurality of regions 112 as the region where the displacement amount is detected.

In the case where region 111 in FIG. 8 is used, the displacement of a portion affected most by the axle weight is detected, so that accurate displacement detection can be expected. However, on the other hand, if noise is mixed for any reason, the detection of the displacement may be disabled. In contrast, in the case where the plurality of regions 112 in FIG. 9 are used, the displacements obtained in the plurality of regions 112 are averaged, so that the displacement detection immune to noise becomes possible. Moreover, however the region where the displacement is detected is provided, in a state where the region is limited to a vicinity of the region directly under wheel 131, which is most easily affected by the axle weight, the displacement of road 101 can be detected. Therefore, the displacement amount having a high correlation with an axle weight value of the vehicle can be detected.

Moreover, a certain degree of time lag is present in the occurrence of the displacement. Thus, for example, it is also effective that region 111 or the plurality of regions 112 where the displacement amount is detected is set closer to a rear side in a traveling direction of vehicle 130 with respect to spot 110

[2-3. Effects and the Like]

As described above, in the second exemplary embodiment, axle weight measurer 310 detects wheel 131 of vehicle 130, and detects the road surface displacement from the captured image in the region close to wheel 131 in the road of the captured image. Since the road surface displacement is detected directly under wheel 131 most easily affected by the axle weight, or from the region near the foregoing, a displacement amount having a high correlation with the axle weight of vehicle 130 can be obtained. Accordingly, the extent of the deterioration or the fatigue damage of bridge 102 can be estimated more accurately.

Third Exemplary Embodiment

In an axle weight measurer in a third exemplary embodiment, an axle weight calculator calculates an axle weight in accordance with a number of tires per wheel in a traveling vehicle. A monitoring system of the third exemplary embodiment is different from monitoring system 1 of the first exemplary embodiment in a configuration of the axle weight measurer, and thus, the axle weight measurer will mainly be described with reference to the drawings.

Hereinafter, details of the foregoing will be described with reference to the drawings.

[3-1. Configuration]

Figure 10:
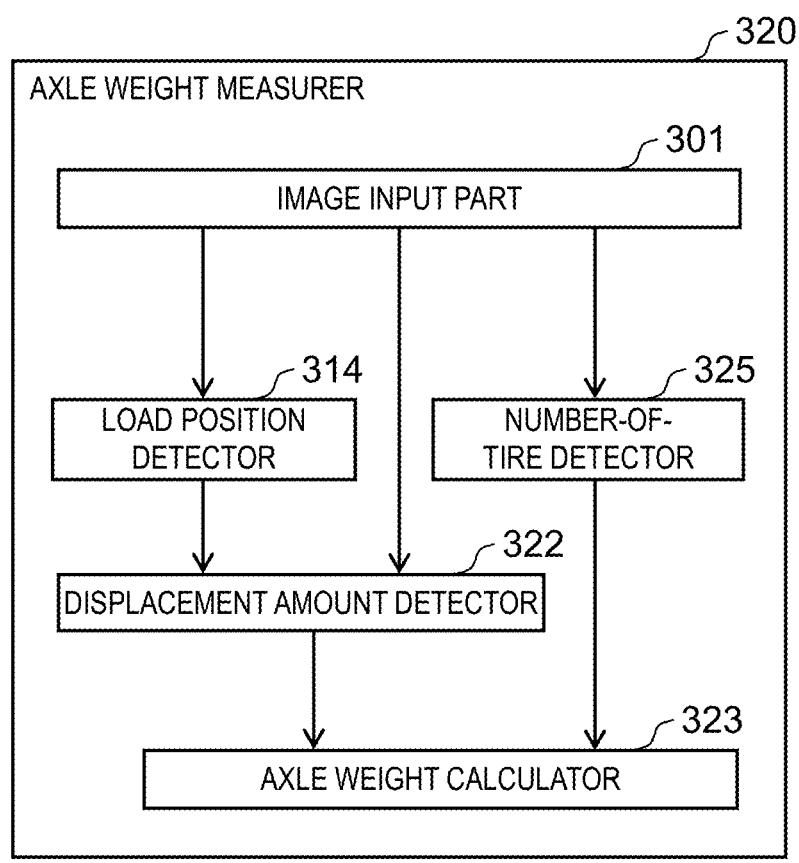
FIG. 10 is a block diagram showing a configuration of an axle weight measurer in a third exemplary embodiment.

FIG. 10 is a block diagram showing the configuration of axle weight measurer 320 in the third exemplary embodiment. In FIG. 10, components that perform the same operations to those of axle weight measurer 310 of the second exemplary embodiment (see FIG. 6) are given the same reference marks, and description thereof is omitted. As shown in FIG. 10, axle weight measurer 320 is configured such that some functions are changed from axle weight measurer 310 in the second exemplary embodiment. Specifically, number-of-tire detector 325 is added, and further, with this addition, axle weight calculator 303 is newly changed to axle weight calculator 323. Therefore, number-of-tire detector 325 and axle weight calculator 323 will mainly be described here.

Number-of-tire detector 325 detects the number of tires per axle of the vehicle from the plurality of captured images obtained by imaging road 101 of the vehicle. Here, as to the wheel, there are types called a single tire and a double tire. In the single tire, two tires are mounted on an axle, and in the double tire, four tires are mounted on the axle. Number-of-tire detector 325 determines the number of tires per wheel from the captured images to output the result.

Axle weight calculator 323 calculates an axle weight value from the displacement amount output from displacement amount detector 322, and the number of tires supplied from number-of-tire detector 325.

Operation of axle weight measurer 320 having the above-described configuration will be described with reference to the drawings hereafter.

[3-2. Operation]

Figure 11:
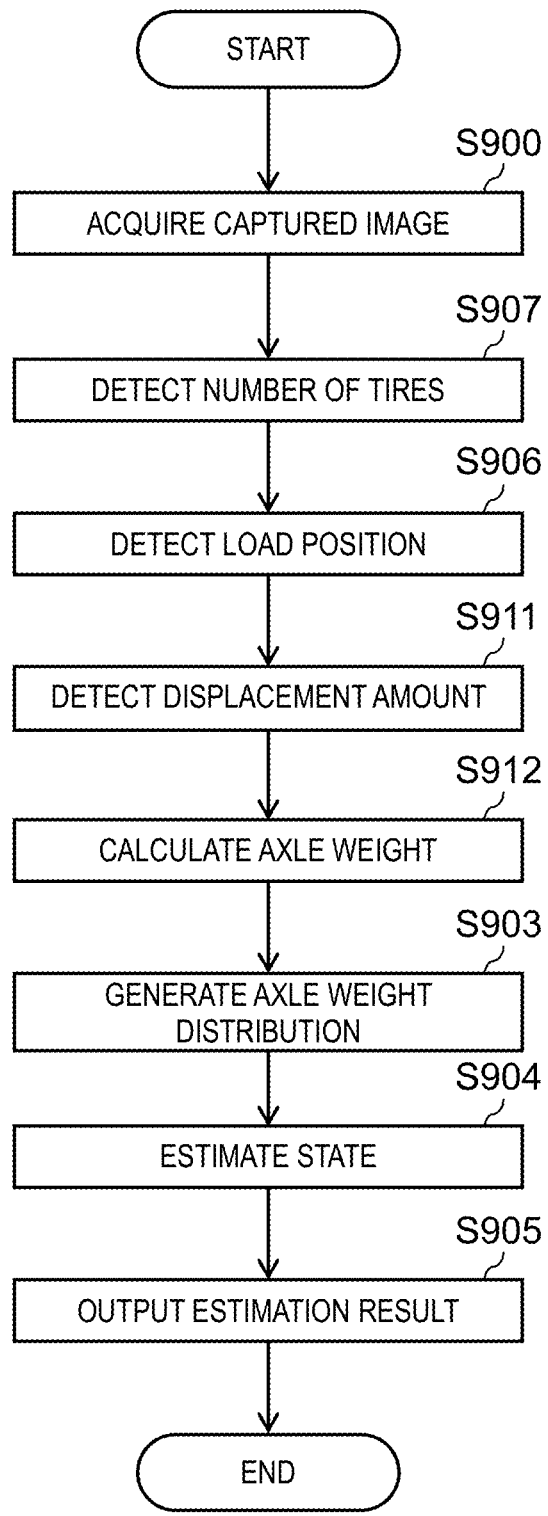
FIG. 11 is a flowchart for describing operation of a monitoring system according to the third exemplary embodiment.

FIG. 11 is a flowchart for describing operation of the monitoring system according to the third exemplary embodiment. In FIG. 11, steps of performing the same operations as those in the flowchart of FIG. 7 are given the same reference marks, and description thereof is omitted.

Number-of-tire detector 325 detects a portion corresponding to each of the wheels of the traveling vehicle inside the plurality of captured images received by image input part 301. Number-of-tire detector 325 detects the wheel by a method similar to that of load position detector 314. Number-of-tire detector 325 detects the number of tires per wheel from each of the detected images of the wheel (step S907).

As a method for detecting the number of tires of the wheel, a method of detecting the number of tires by template matching may be used. In the template matching, a template matching a shape of a type of the wheel is stored in number-of-tire detector 325 beforehand, and the template and each of the captured images are compared. Moreover, a method of searching for an object of the double tire from an inside of each of the images on a basis of the shape of the wheel may be used. Moreover, a method of causing pictures of a number of wheels to be learned by machine learning in advance, and detecting the number of tires of the wheel from the image by artificial intelligence, or the like may be used. Number-of-tire detector 325 outputs a detection result of the number of tires of the wheel to axle weight calculator 323.

Axle weight calculator 323 calculates the axle weight from the displacement amount in accordance with the number of tires of the wheel detected by number-of-tire detector 325 (step S912).

Figure 12A:
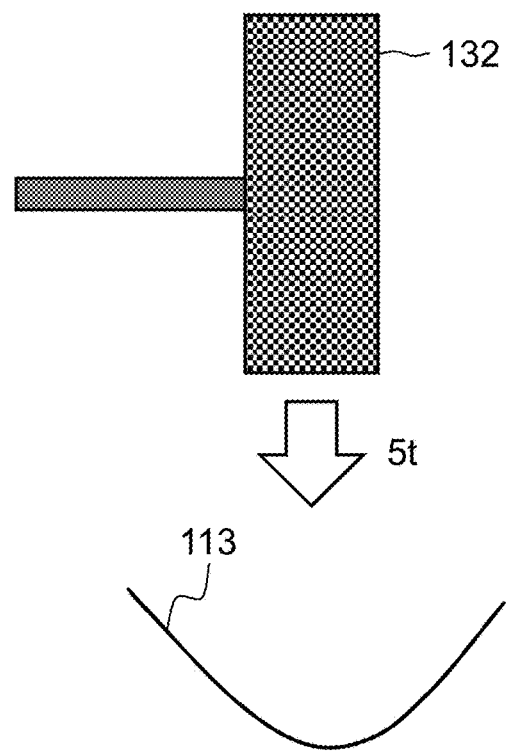
FIG. 12A is a diagram for describing a road surface displacement amount in a single tire.
Figure 12B:
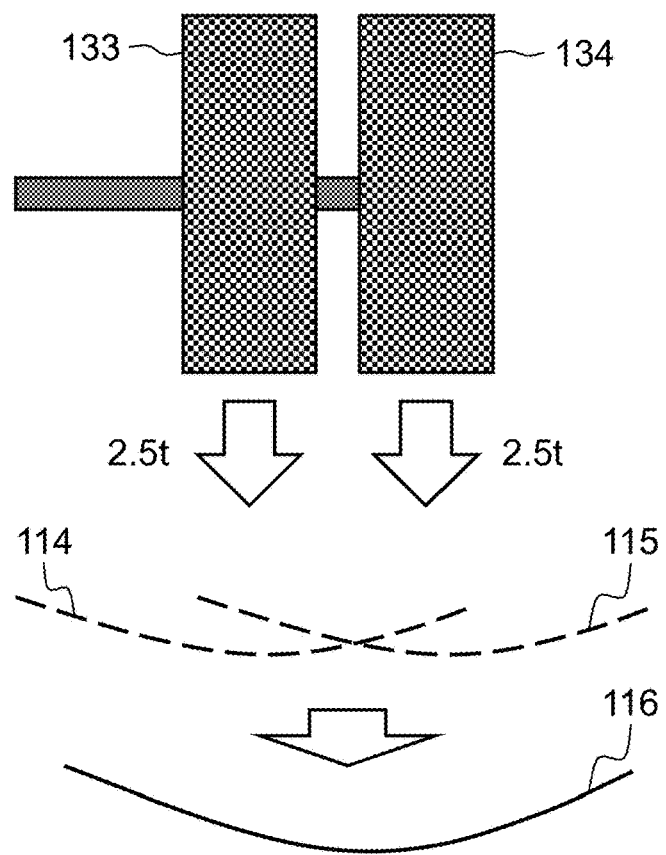
FIG. 12B is a diagram for describing the road surface displacement amount in a double tire.

First, a difference in the road surface displacement by the number of tires of the wheel will be described with reference to FIGS. 12A and 12B. FIG. 12A is a diagram for describing a road surface displacement amount in the single tire. FIG. 12B is a diagram for describing a road surface displacement amount in the double tire.

As shown in FIG. 12A, for example, in the vehicle having the axle weight of 10 tons, an wheel load of the wheel on one side is ideally 5 tons. In the case where the wheel is the single tire, a load of 5 tons is applied to the road surface of the road from one tire 132, and the road surface displacement becomes displacement 113. In contrast, as shown in FIG. 12B, in the case where the wheel is the double tire, the wheel load of 5 tons are applied to the road surface of the road from two tires 133, 134. This is because as the number of tires attached to the wheel increases, the load per tire decreases (a pressure becomes smaller), and the road surface displacement becomes smaller. The road surface displacement of the road in this case is displacement 116 resulting from synthesizing displacement 114 by a load of 2.5 tons applied from tire 133, and displacement 115 by a load of 2.5 tons applied from tire 134.

As shown in FIGS. 12A and 12B, the displacement of the road in the double tire is smaller than that in the single tire in the case of the same axle weight or the same wheel load. This can enhance estimation accuracy of the axle weight by changing the displacement coefficient at the time of the conversion from the displacement amount into the axle weight in accordance with the number of tires of the wheel.

When calculating the axle weight, for example, using linear function w=αd, axle weight calculator 323 changes displacement coefficient α in accordance with the number of tires of the wheel. Axle weight calculator 323 uses displacement coefficient α in the case where the wheel is the single tire. In the case of the double tire, load points are distributed, and the displacement becomes smaller, as compared with the single tire. Therefore, axle weight calculator 323 multiplies displacement coefficient α by predetermined value γ (hereinafter, referred to as tire coefficient γ) to generate new displacement coefficient β, and calculate the axle weight, using linear function w=βd.

For example, a vehicle having a single tire and a vehicle having a double tire, both tires each having a known axle weight, may be caused to travel in the road to experimentally find the displacement of the road 101 at that time, and find tire coefficient γ from expression γ=(the displacement in the case where the wheel is the single tire)/(the displacement in the case where the wheel is the double tire). Moreover, a road pavement structure may be modeled, for example, using a multilayer elasticity theory, and a numeral value obtained by results from performing simulation, varying a position where the load is applied, and a magnitude of the load may be used as tire coefficient γ.

[3-3. Effects and the Like]

As described above, in the third exemplary embodiment, axle weight calculator 323 further includes number-of-tire detector 325 that detects the number of tires per wheel, and calculates the axle weight from the road surface displacement in accordance with the number of tires.

This can enhance the accuracy of the axle weight estimation. Accordingly, the extent of the deterioration or the fatigue damage of the bridge can be estimated more accurately.

Note that between the single tire and the double tire, the pressure applied to the road surface varies, depending on a ground contact area of the wheel. This also changes the road surface displacement amount. From the foregoing, number-of-tire detector 325 may detect a range where the tire is grounded or a type of the tire in addition to the number of tires. Axle weight calculator 323 may change displacement coefficient α in accordance with the number of tires, the range where the tire is grounded, or the type of the tire Fourth Exemplary Embodiment An axle weight measurer in a fourth exemplary embodiment automatically calculates and updates displacement coefficient α in an axle weight calculator. Hereinafter, details of the foregoing will be described with reference to the drawings.

[4-1. Configuration]

Figure 13:
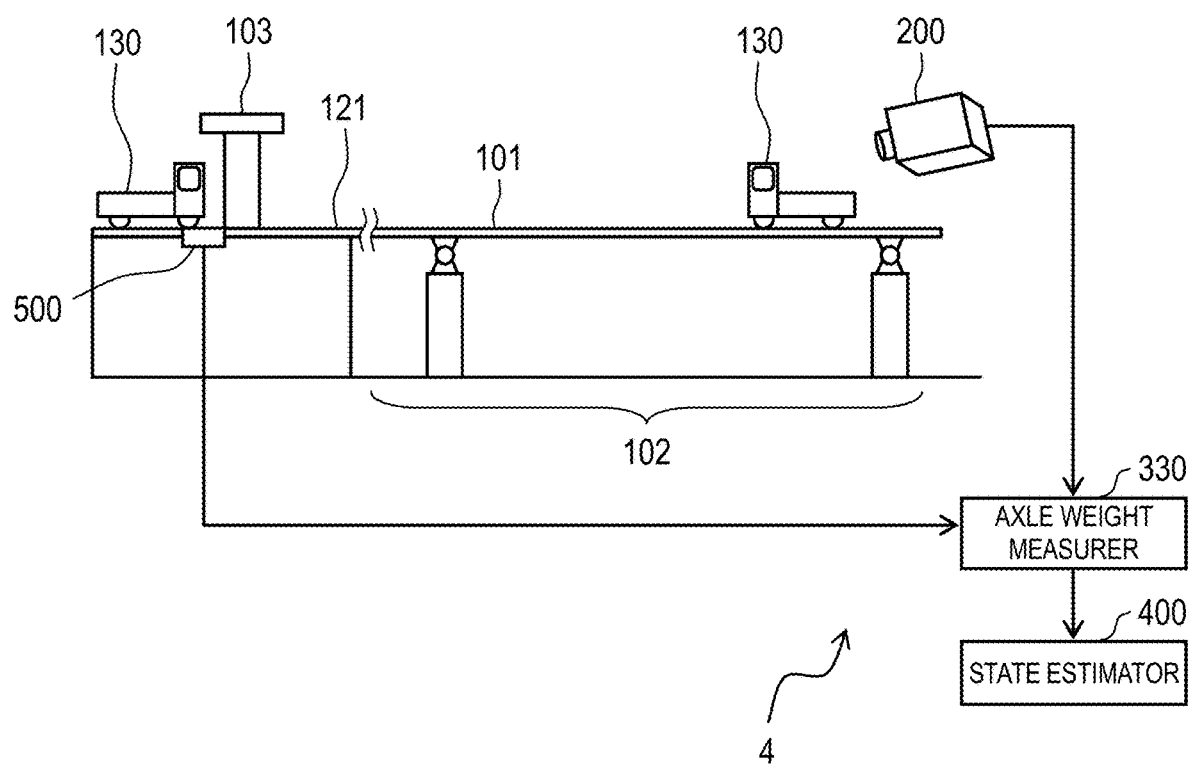
FIG. 13 is a schematic diagram showing a whole configuration of a monitoring system according to a fourth exemplary embodiment.

FIG. 13 is a schematic diagram showing a whole configuration of a monitoring system according to the fourth exemplary embodiment. In FIG. 13, the same components as those of monitoring system 1 of the first exemplary embodiment (see FIG. 2) are given the same reference marks, and description thereof is omitted.

As shown in FIG. 13, monitoring system 4 includes axle weight meter 500, imaging device 200, axle weight measurer 330, and state estimator 400.

In FIG. 13, gate 103 is an entrance and exit port for vehicles on road 121 connected to road 101 on bridge 102. Axle weight meter 500 is installed in a vicinity of gate 103 to measure an axle weight of vehicle 130 passing gate 103. When the road is a highway, gate 103 is normally a tollgate, but the present exemplary embodiment is not limited thereto. Also, it is not essential that gate 103 itself exists.

Figure 14:
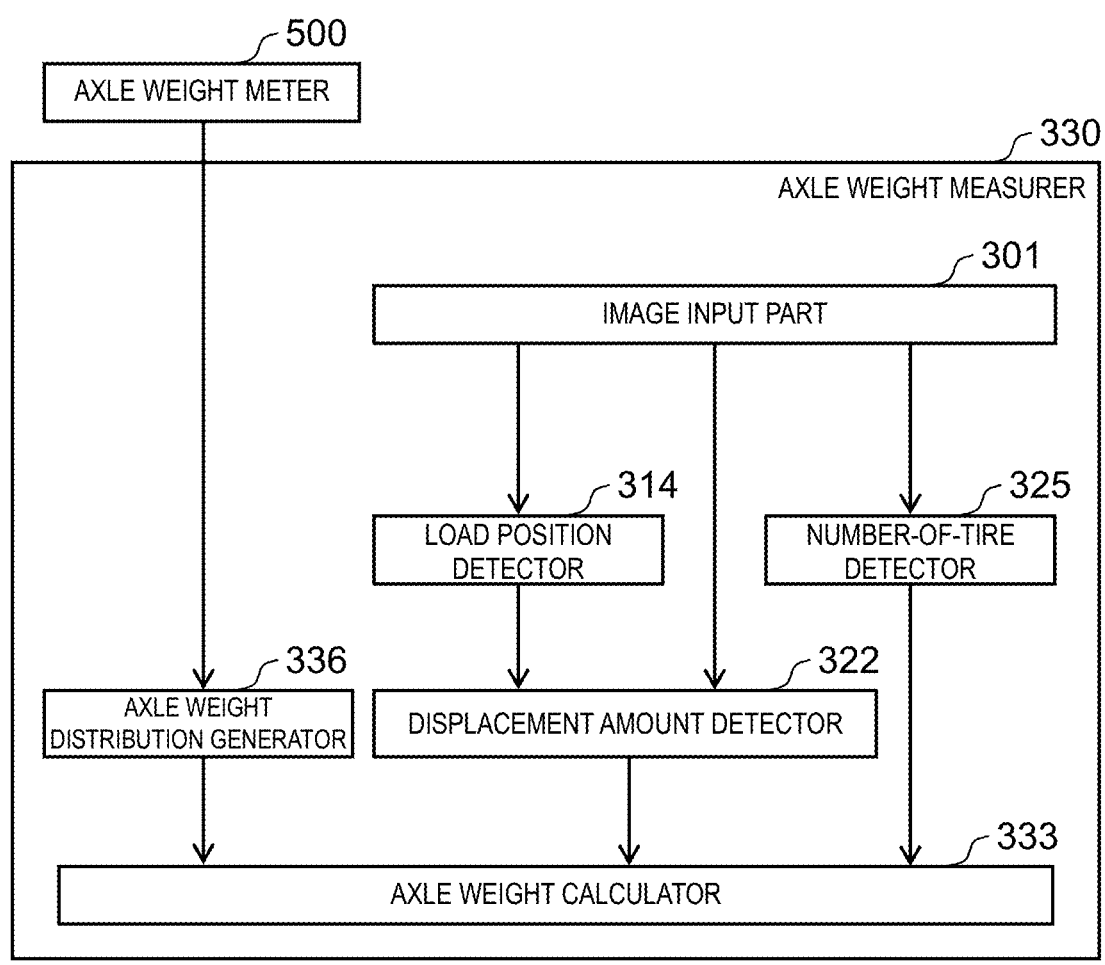
FIG. 14 is a block diagram showing a configuration of an axle weight measurer in the fourth exemplary embodiment.

FIG. 14 is a block diagram showing a configuration of axle weight measurer 330 in the fourth exemplary embodiment. In FIG. 14, components that perform the same operations to those of axle weight measurer 320 of the third exemplary embodiment (see FIG. 10) are given the same reference marks, and description thereof is omitted.

As shown in FIG. 14, axle weight measurer 330 is configured such that some functions are changed from axle weight measurer 320 in the third exemplary embodiment. Specifically, axle weight distribution generator 336 that operates upon receiving data measured by axle weight meter 500 is added, and further, with this addition, axle weight calculator 323 is newly changed to axle weight calculator 333.

Axle weight meter 500 is embedded in road 121 and measures the axle weight of vehicle 130 that passes gate 103 and enters road 101. Axle weight meter 500 is, for example, a gravimeter including a load cell. Every time axle weight meter 500 measures the axle weight of vehicle 130, axle weight meter 500 outputs a result thereof to axle weight distribution generator 336. An input from axle weight meter 500 to axle weight distribution generator 336 is performed through wireless or wired communication.

Axle weight distribution generator 336 classifies the axle weight measured by axle weight meter 500 by magnitude. For example, axle weight distribution generator 336 classifies the received axle weight by bin with a width of 1 bin as 1 ton, and generates a histogram (hereinafter, referred to as an axle weight distribution). Axle weight distribution generator 336 sequentially classifies and integrates the axle weight measured by axle weight meter 500. Axle weight distribution generator 336 outputs an axle weight distribution generated by accumulating the axle weight in a predetermined period to axle weight calculator 333.

Axle weight calculator 333 classifies, by magnitude, a displacement amount of road 101 output from displacement amount detector 322. For example, axle weight calculator 333 classifies the axle weight output from displacement amount detector 322 by bin with a width of 1 bin as 1 pixel, and generates a histogram (hereinafter, referred to as a displacement distribution). Axle weight calculator 333 sequentially classifies and integrates the displacement amount output from displacement amount detector 322. Here, axle weight calculator 333 acquires tire coefficient γ described in the third exemplary embodiment from a number of tires of a wheel detected by number-of-tire detector 325. In the case where the wheel that has caused a road surface displacement is a double tire, axle weight calculator 333 uses, for displacement distribution generation, a displacement amount obtained by multiplying the displacement amount supplied from displacement amount detector 322 by tire coefficient γ. This is measures against the difference in the displacement amount caused between the single tire and the double tire even in the same axle weight. Axle weight calculator 333 calculates and updates the displacement coefficient used for the axle weight calculation from the axle weight distribution output from axle weight distribution generator 336 and the generated displacement distribution.

Hereinafter, operation that axle weight measurer 330 having the above-described configuration performs will be described with reference to the drawings.

[4-2. Operation]

The axle weight distribution generated by axle weight distribution generator 336 is an axle weight distribution generated from the axle weights of a plurality of vehicles that enter road 121 connected to bridge 102. At this time, if the road connected from gate 103 in a traveling direction of vehicle 130 is only road 101 on bridge 102 without having any bifurcation or the like in the middle, the vehicles that have passed gate 103 pass road 101. In this case, the axle weight distribution generated by axle weight distribution generator 336 can be interpreted as the same as the axle weight distribution of the plurality of vehicles passing road 101.

Figure 15:
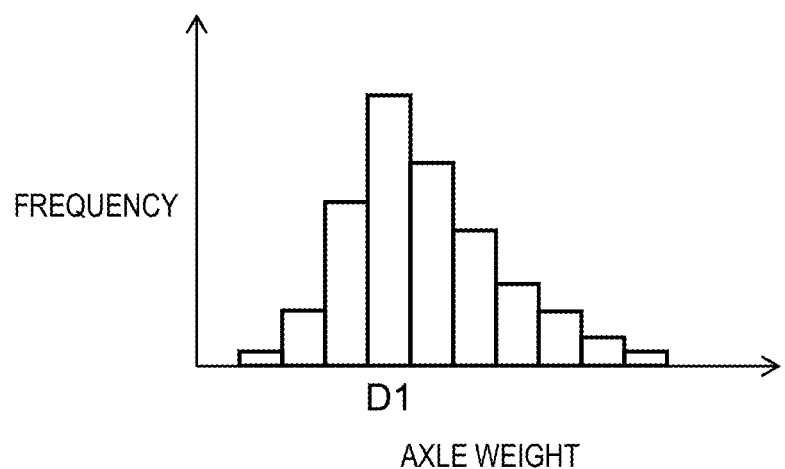
FIG. 15 is a diagram showing one example of the axle weight distribution.
Figure 16:
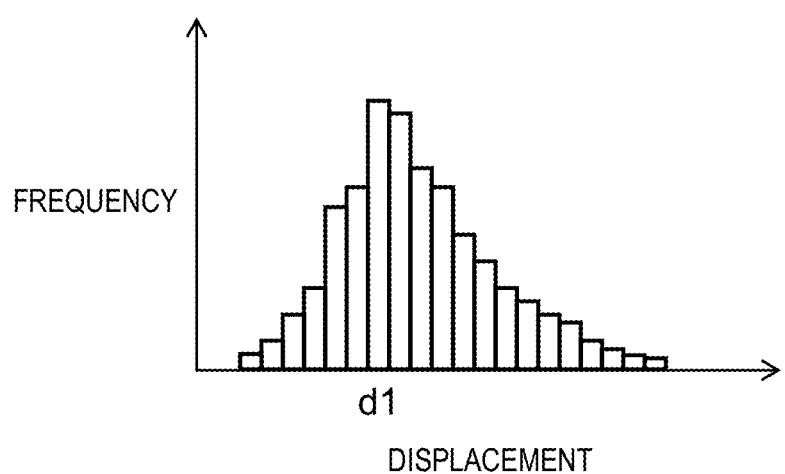
FIG. 16 is a diagram showing one example of a displacement distribution.

FIG. 15 is a diagram showing one example of the axle weight distribution. FIG. 16 is a diagram showing one example of the displacement distribution. In FIG. 15, a horizontal axis indicates the axle weight, and a vertical axis indicates a frequency of the axle weight. Moreover, in FIG. 16, a horizontal axis indicates the displacement, and a vertical axis indicates a frequency of the displacement.

For example, if the axle weight distribution generated by axle weight distribution generator 336 has a shape as shown in FIG. 15, it is expected that the shape of the axle weight distribution generated by axle weight distribution generator 336 and a shape of the displacement distribution generated by axle weight calculator 333 substantially matches each other although they are different in a unit of 1 bin. At this time, for example, axle weight calculator 333 makes matching between the shape of the axle weight distribution in FIG. 15 and the shape of the displacement distribution in FIG. 16. When a correspondence relationship between each bin of an axle weight axis of the axle weight distribution and each bin of a displacement axis of the displacement distribution is found, displacement coefficient α for axle weight calculation from the axle weight distribution and the displacement distribution can be found.

For example, if axle weight D1 of bins having a maximum frequency in the axle weight distribution, and displacement d1 of bins having a maximum frequency in the displacement distribution correspond to each other, displacement coefficient α can be calculated from α=D1/d1.

As a method for making matching between the two distributions, a known technique may be used in which, for example, after the vertical axes and the horizontal axes of both are normalized by respective maximum values, a difference is obtained while changing a magnitude and a position of one of the distributions little by little, and a condition in which a sum of squares of the difference becomes minimum is searched for, or the like.

Moreover, the foregoing description has been given on the assumption that the road connected from gate 103 in the traveling direction of the vehicle does not have any bifurcation or the like in the middle, and that only road 101 exists on the bridge 102. If there is a bifurcation or a confluence, by measuring the axle weights of many vehicles, an axle weight distribution on which traffic characteristics of the surrounding area including road 101 are reflected is generated to find displacement coefficient α. At this time, axle weight distribution generator 336 may receive another axle weight measured by another weight meter, in addition to the axle weight measured by the weight meter at gate 103. The other weight meter is, for example, installed in surrounding areas close to or peripheral to the area in which road 101 exists. Axle weight distribution generator 336 may utilize the other axle weight in addition to the axle weight measured at gate 103 to obtain an axle weight distribution on which the traffic characteristics of the surrounding areas are reflected. Furthermore, axle weight distribution generator 336 may generate the axle weight distribution by applying different weightings to measurement results of the respective axle weight meters in view of a positional relationship between road 101 and the respective axle weight meters installed in the surrounding, a traffic volume, and the traffic characteristics.

[4-3. Effects and the Like]

As described above, in monitoring system 4 of the fourth exemplary embodiment, axle weight measurer 330 accumulates the axle weight measured by axle weight meter 500 disposed in road 121 (the other road) connected to road 101 to generate the axle weight distribution (the other axle weight distribution), and accumulates the road surface displacement to generate the displacement distribution. Axle weight measurer 330 calculates and updates displacement coefficient α, using the axle weight distribution and displacement distribution thus generated.

This makes it unnecessary to beforehand decide displacement coefficient α, using the vehicles whose axle weight are known. Accordingly, initial setting of the system becomes easy and convenient, and maintenance in long-term utilization also becomes easy and convenient.

Moreover, even if the relationship between the axle weight and the displacement changes due to secular change or fatigue damage of road 101, using the present method also enables displacement coefficient α to be automatically updated.

Moreover, observing temporal change of calculated displacement coefficient α enables change in displacement amount of road 101 with respect to the axle weight to be monitored. Generally, it is known that if in the road pavement, deterioration and fatigue damage are caused, the displacement when the vehicle passes expands. That is, the road surface displacement expands with respect to the same axle weight. Namely, if a tendency that displacement coefficient α becomes smaller is observed, it can be predicted that the deterioration has progressed. From the foregoing, by calculating displacement coefficient α to monitor the secular change thereof, the degrees of deterioration and fatigue damage of the pavement of road 101 can also be known.

Moreover, in the fourth exemplary embodiment, while axle weight meter 500 is installed in the vicinity of gate 103 of the entrance, it may be installed at any position that is connected to road 101. As axle weight meter 500, a heavy mat may be used.

Moreover, in the fourth exemplary embodiment, by increasing a number of pieces of sample data for generating the axle weight distribution and the displacement distribution, an error in each of the distributions can be averaged. Therefore, in the fourth exemplary embodiment, a configuration may be employed in which the detection of the portion where the wheel and bridge 102 comes into contact with each other, and the detection of the number of tires described in the second and third exemplary embodiments are not performed.

Fifth Exemplary Embodiment

In a fifth exemplary embodiment, a monitoring system will be described that uses identification information of a traveling vehicle to calculate an axle weight.

Hereinafter, details of the foregoing will be described with reference to the drawings.

[5-1. Configuration]

Figure 17:
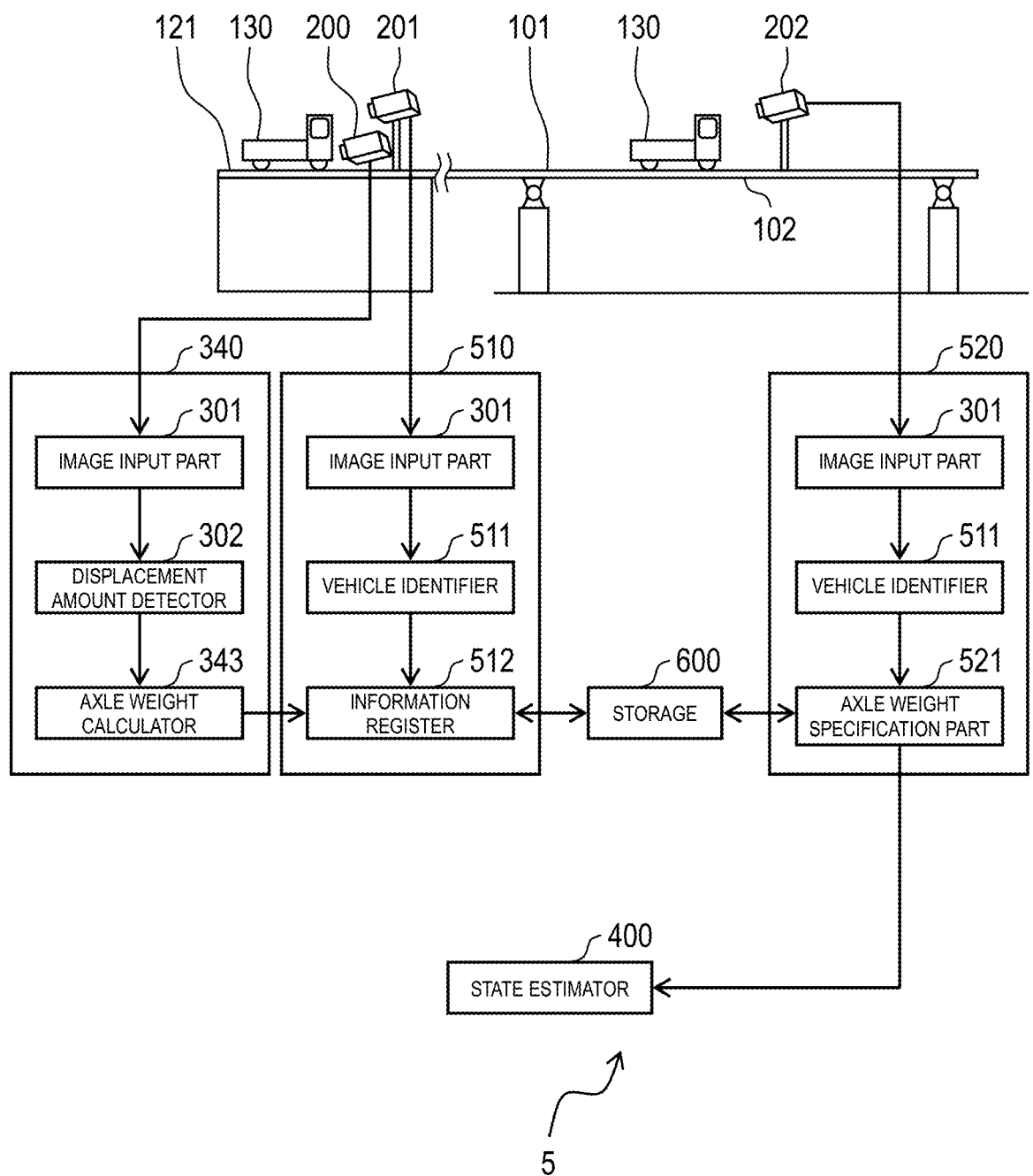
FIG. 17 is a schematic diagram showing a whole configuration of a monitoring system according to a fifth exemplary embodiment.

FIG. 17 is a schematic diagram showing a whole configuration of the monitoring system according to the fifth exemplary embodiment. Components that perform the same operations as those of monitoring system 1 of the first exemplary embodiment (see FIG. 2) are given the same reference marks, and description thereof is omitted.

As shown in FIG. 17, monitoring system 5 includes imaging devices 200, 201, 202, axle weight measurer 340, state estimator 400, axle weight register 510, axle weight extractor 520, and storage 600. Axle weight measurer 340 includes image input part 301, displacement amount detector 302, and axle weight calculator 343. Axle weight register 510 includes image input part 301, vehicle identifier 511, and information register 512. Axle weight extractor 520 includes image input part 301, vehicle identifier 511, and axle weight specification part 521.

Axle weight measurer 340 calculates the axle weight of vehicle 130 from a captured image that imaging device 200 installed in road 121 connected to road 101 has captured. Axle weight measurer 340 outputs the axle weight to information register 512. Transmission of the information may be performed through wired communication or wireless communication.

Axle weight register 510 extracts the identification information for identifying vehicle 130 from a captured image that imaging device 201 installed in road 121 connected to road 101 has captured, and associates the axle weight measured by axle weight measurer 340 and the identification information with each other to register the axle weight and the identification information in storage 600. Vehicle identifier 511 extracts the identification information for identifying the vehicle from the captured image that imaging device 201 has captured. Information register 512 associates the identification information of vehicle 130 that vehicle identifier 511 has identified with the axle weight output from axle weight calculator 343, and registers the identification information and the axle weight in an axle weight table stored by storage 600. Access to storage 600 may be performed through wired communication or wireless communication.

Axle weight extractor 520 extracts the identification information for identifying vehicle 130 from a captured image that imaging device 202 installed in road 101 has captured, and extracts the axle weight of vehicle 130 from the axle weight table stored by storage 600, using the extracted identification information. Axle weight specification part 521 specifies the axle weight of vehicle 130 from the axle weight table stored by storage 600, using the identification information that vehicle identifier 511 has identified. Axle weight specification part 521 outputs the axle weight to state estimator 400. Access to storage 600 may be performed through wired communication or wireless communication. Storage 600 stores the axle weight table in which the identification information and the axle weight of the vehicle are associated with each other.

[5-2. Operation]

Figures 18, 19:
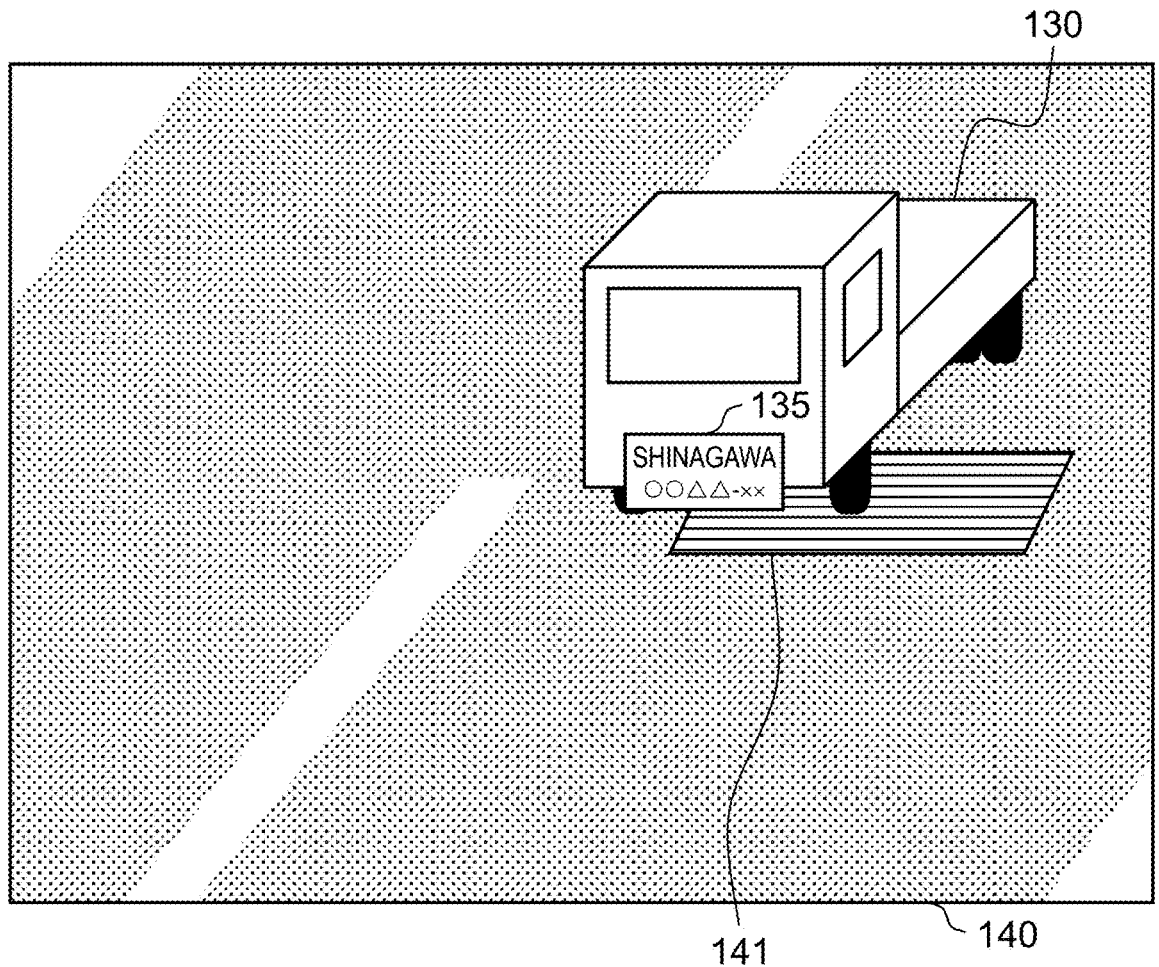
FIG. 18 is a diagram showing one example of the captured image.
FIG. 19 is a diagram showing one example of an axle weight table stored in a storage.

FIG. 18 is a diagram showing one example of the captured image that imaging device 201 and imaging device 202 have captured. Imaging devices 201, 202 image vehicle 130, for example, from a diagonally front side as shown in composition 140 in order to obtain an appropriate image for obtaining the identification information for identifying passing vehicle 130. In composition 140, a number plate 135 of vehicle 130 can be imaged. This allows a vehicle number described in number plate 135 to be utilized as the identification of the vehicle. In the present exemplary embodiment, the identification information for identifying the vehicle is a vehicle number.

Vehicle identifier 511 detects number plate 135 of vehicle 130 by image processing from the captured image that imaging device 201 has captured. Vehicle identifier 511 extracts the vehicle number described in number plate 135 as the identification information of vehicle 130.

Information register 512 of axle weight register 510 associates the axle weight of vehicle 130 calculated by axle weight calculator 343 with the vehicle number that vehicle identifier 511 has identified, and stores the axle weight and the vehicle number in the axle weight table of storage 600. In order to associate the axle weight and the vehicle number with each other, it is necessary that the measured axle weight is determined to be the axle weight of the vehicle. For this, for example, a position and a direction of imaging device 200 are decided beforehand, and imaging device 200 is installed such that region 141 on the road is a region where the axle weight is measured by axle weight measurer 340. Axle weight measurer 340 measures the axle weight, using an image of region 411. In this case, information register 512 may associate the axle weight with the vehicle number that vehicle identifier 511 extracts substantially at the same time as timing when axle weight calculator 343 outputs the axle weight, and may register the axle weight and the vehicle number in storage 600. For this, axle weight measurer 340 and axle weight register 510 are connected by a signal line not shown, and clocks of both are substantially synchronized. Axle weight measurer 340 may include vehicle identifier 511 and information register 512, and the foregoing processing may be performed with a captured picture that one imaging device has captured Moreover, in the case where other vehicles in front and in the rear exists, and a plurality of number plates are in composition 140, a number plate existing at a position closest to a traveling direction side of the vehicle with respect to region 141 may be searched for. The vehicle number described therein and the axle weight may be associated with each other. As a method for associating the vehicle number and the axle weight with each other, a plurality of other methods such as a method of detecting a relationship between region 141 of the vehicle, and a position or a size of the vehicle by a sensor to associate the relationship, and the like may be considered, but any method may be employed.

FIG. 19 is a diagram showing one example of the axle weight table stored in the storage. As shown in FIG. 19, after one vehicle ID is given, axle weight table 601 associates the vehicle number and the axle weight with each other, and stored the vehicle number and the axle weight. If the vehicle has a plurality of axles, the vehicle ID and the axle weights may be sequentially stored from an upper stage in order of the measurement of the axle weights, that is, from a front wheel. Information register 512 performs update of axle weight table 601 constantly or at specific timing.

Vehicle identifier 511 of axle weight extractor 520 detects number plate 135 of vehicle 130 by the image processing from the captured image that imaging device 202 has captured, and extracts the vehicle number of the vehicle as the identification information from number plate 135. The vehicle number and axle weight table 601 stored in storage 600 are collated with each other, and the axle weight of vehicle 130 captured by imaging device 202 is specified. Axle weight extractor 520 outputs the specified axle weight to state estimator 400.

State estimator 400 estimates a state of bridge 102 on a basis of the axle weight obtained from axle weight extractor 520.

[5-3. Effects and the Like]

As described above, monitoring system 5 of the fifth exemplary embodiment includes axle weight measurer 340, axle weight register 510, axle weight extractor 520, and state estimator 400. Axle weight measurer 340 detects the displacement amount (road surface displacement) of road 121 from the captured image (first captured image) obtained by imaging road 121 when vehicle 130 passes at the predetermined spot of road 121 that vehicle 130 passes, and calculates the axle weight of vehicle 130 from the road surface displacement and the displacement coefficient. Axle weight register 510 identifies the identification information of the vehicle 130 from the captured image (second captured image) obtained by imaging road 121 when vehicle 130 passes at the predetermined spot of road 121 that vehicle 130 passes, and associates the axle weight calculated by axle weight measurer 340 with the identification information, and registers the axle weight and the identification information in axle weight table 601. Axle weight extractor 520 identifies the identification information of vehicle 130 from the captured image (third captured image) obtained by imaging vehicle 130 in road 101 (other road) connected to road 121, and specifies the axle weight corresponding to the identification information from axle weight table 601 to output the specified axle weight. State estimator 400 estimates the deterioration degree of bridge 102 having road 101, using the axle weight output by axle weight extractor 520.

This enables the axle weight to be calculated without having a function of calculating the axle weight from the displacement amount of the road surface. In other words, the axle weight measurer having the function of calculating the axle weight from the displacement amount of the road surface need not be installed in each bridge to be evaluated. For example, in a structure such as a highway, in which it is assumed that an entering vehicle necessarily passes a gate such as a tollgate, axle weight measurer 340 and axle weight register 510 are installed in each gate, and only axle weight extractor 520 is installed in bridge 102 desired to be evaluated, which enables the evaluation of bridge 102 to be performed. This can reduce a total installation cost.

In the fifth exemplary embodiment, a description has been given on the assumption that imaging devices 200, 201, axle weight measurer 340, and axle weight register 510 are installed on a front side in the traveling direction of vehicle 130 on the road with respect to imaging device 202 and axle weight extractor 520. However, the present exemplary embodiment is not limited thereto. Imaging devices 200, 201, axle weight measurer 340, and axle weight register 510 may be installed on a back side in the traveling direction of vehicle 130 on the road with respect to imaging device 202 and axle weight extractor 520. In this case, even when axle weight extractor 520 identifies vehicle 130, the information relating to the vehicle number has not existed in axle weight table 601 yet. Therefore, if the information relating to the vehicle number does not exist in axle weight table 601, axle weight extractor 520 may refer to axle weight table 601, for example, periodically at an interval of a certain period, and after the information relating to the vehicle number has been registered in axle weight table 601, axle weight extractor 520 may specify the axle weight corresponding to the vehicle number and output the axle weight to state estimator 400.

Moreover, in the fifth exemplary embodiment, for example, as in axle weight measurer 310 of the second exemplary embodiment, the configuration may be such that the wheel position of the traveling vehicle is detected, and that the displacement of the road is detected in accordance with the position. In this case, the axle weight found from the region near the spot directly under the wheel can be obtained accurately and stably. Furthermore, the function of calculating the axle weight in view of the number of tires of the wheel as in the third exemplary embodiment may be added. In this case, the accuracy of the calculated axle weight can be more enhanced.

The monitoring system of the present disclosure can be utilized not only for the evaluation of a bridge but also for the evaluation of another structure such as a road or a road pavement. For example, on a road including a highway, many vehicle counting devices each called a traffic counter are installed. This is to count a number and types of the vehicles passing the road to be utilized for survey of a traffic volume, road maintenance and repairing planning based on the survey. Particularly, many image type traffic counters each including the imaging device has a function of reading a vehicle number from a number plate of a passing vehicle in a captured image. For example, by adding, to each of these image type traffic counters, the function of obtaining the axle weight value from the vehicle number described in the fifth exemplary embodiment, the axle weights of the vehicles other than the information of the number and the types of the passing vehicles can also be surveyed. Accordingly, high-accuracy data of the axle weight, which is a load on the road, can be obtained, and can be utilized for prediction of deterioration or fatigue damage of a route where the traffic counter is installed, and surrounding road infrastructure, and reference data of future road maintenance planning. While at this time, the accumulative damage rule can be utilized for the estimation of the deterioration, the present exemplary embodiment is not limited thereto.

Moreover, at an installation point of the exiting traffic counter, the axle weight measurer with information register 512 mounted on axle weight measurer 300 of the first exemplary embodiment may be installed. The configuration may further be such that by utilizing the imaging device and the vehicle number detecting function included by the traffic counter, this axle weight measurer is given the function of generating the information in which the vehicle number and the axle weight are associated with each other. Alternatively, the imaging device itself included in the traffic counter may be diverted to means for observing the displacement of the road surface.

Moreover, axle weight measurer 340 may be installed at an entrance gate such as a tollgate. This allows the axle weights of all vehicles that enter the road to be grasped, and high-accuracy evaluation of deterioration or fatigue damage to be performed. A method for specifying the vehicle need not be necessarily the method of using the vehicle number, and further, need not be limited to the method of automatically performing the specification, using axle weight register 510. For example, a worker may specify the vehicle number, a vehicle type, a color, and the like visually or by the captured image, and input the information to axle weight extractor 520. Alternatively, a worker may read an output of axle weight calculator 343 with a display device or the like not shown, and may input the axle weight of the vehicle traveling in road. 101 to state estimator 400. This allows imaging device 201 and axle weight register 510, imaging device 202 and axle weight extractor 520, and storage 600 to be omitted.

Moreover, as a method for identifying the traveling vehicle, the configuration has been described in which the vehicle number is read by the imaging device to be recognized. However, for example, a method may be used in which a function of ITS (intelligent Transport Systems) such as an ETC (Electronic Toll Collection System), which is installed on a road, is utilized to detect the identification information through radio from traveling vehicles and identify a specific vehicle.

Moreover, in case where a vehicle whose identification information cannot be extracted has passed, axle weight measurer 300 in the first exemplary embodiment may be installed in the bridge in place of axle weight extractor 520.

Sixth Exemplary Embodiment

A monitoring system in a sixth exemplary embodiment evaluates deterioration and fatigue damage of a pavement road, using an axle weight of a traveling vehicle and a displacement amount of a road.

Hereinafter, details of the foregoing will be described with reference to the drawings.

[6-1. Configuration]

Figure 20:
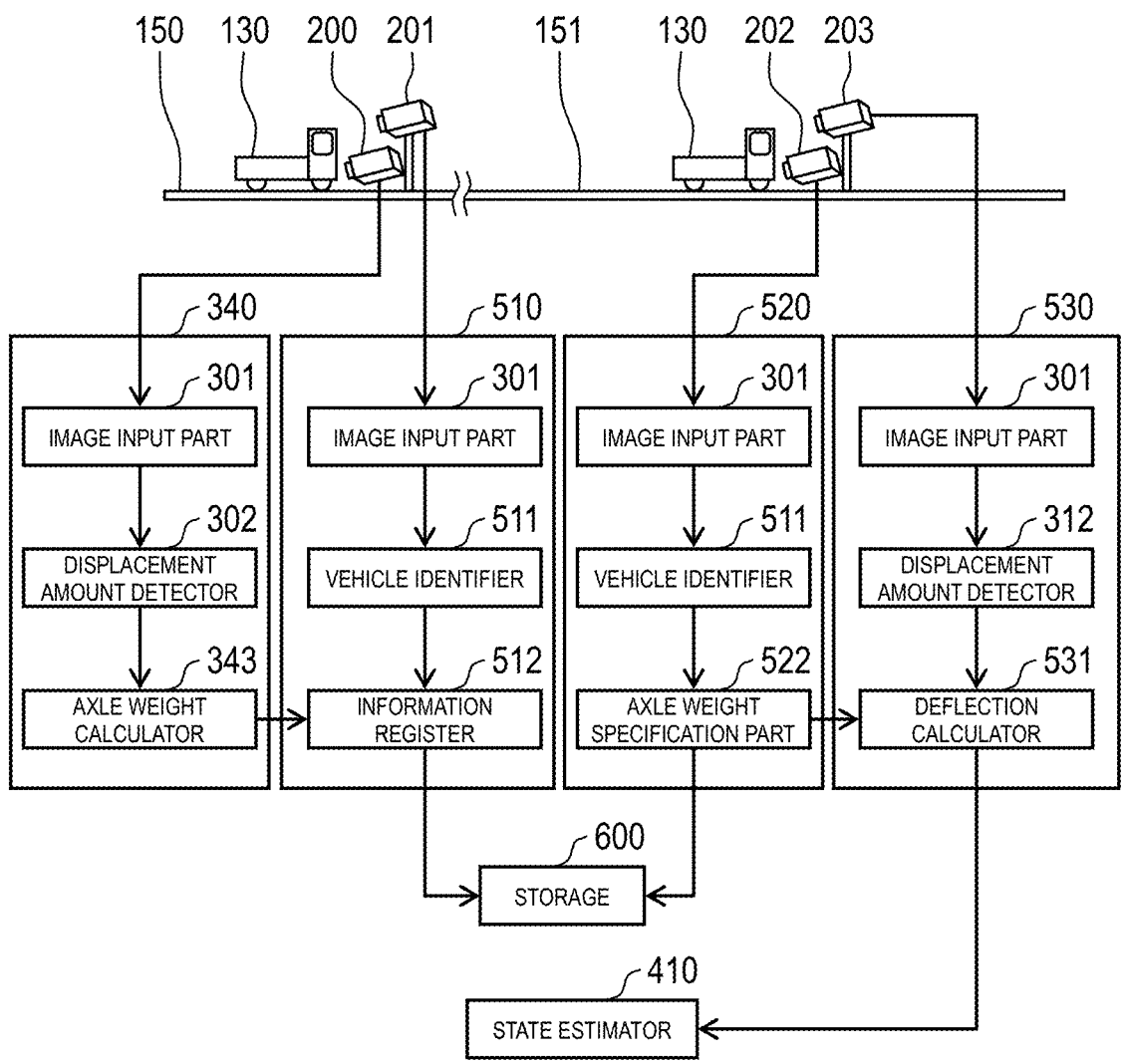
FIG. 20 is a schematic diagram showing a whole configuration of a monitoring system according to a sixth exemplary embodiment.

FIG. 20 is a schematic diagram showing a whole configuration of monitoring system 6 according to the sixth exemplary embodiment. In FIG. 20, components that perform operations similar to those of monitoring system 5 of the fifth exemplary embodiment are given the same reference marks, and description thereof is omitted.

In FIG. 20, asphalt pavement is applied to road 150 and road 151.

Monitoring system 6 includes imaging devices 200 to 203, axle weight measurer 340, axle weight register 510, axle weight extractor 520, deflection measurer 530, state estimator 410, and storage 600.

Axle weight specification part 522 of axle weight extractor 520 outputs a specified axle weight to deflection measurer 530.

Deflection measurer 530 measures displacements caused by a load of a wheel of vehicle 130 traveling on road 151 at a plurality of positions, using a captured image that imaging device 203 has captured in road 151. In the sixth exemplary embodiment, hereinafter, the displacements continuously caused, which are measured and acquired at the plurality of positions, are referred to as a deflection. Deflection measurer 530 outputs a measured deflection as a deflection distribution.

Deflection measurer 530 is implemented, for example, in such a way that in a computer (not shown) including a microprocessor and a memory (not shown), the microprocessor executes a program stored in the memory.

State estimator 410 estimates a state of pavement of road 151 (deterioration, fatigue damage, and positions thereof) from the deflection distribution output by deflection measurer 530.

[6-2. Deflection Measurer]

As shown in FIG. 20, deflection measurer 530 includes image input part 301, displacement amount detector 312, and deflection calculator 531.

Imaging device 203 images road 151 as an imaging object at a time point when vehicle 130 passes. One or more captured images that imaging device 203 has captured are input to image input part 301 of deflection measurer 530. The input of the captured images can be performed through wireless or wired communication, or through a recording medium.

By using the captured image received by image input part 301, at each of the plurality of positions on road 151, displacement amount detector 312 detects a displacement amount in the captured image corresponding to the displacement caused in the road by application of a load (i.e., axle weight) on road 151 by the vehicle traveling. At this time, imaging device 203 is installed with a direction thereof decided beforehand such that a spot where wheels of vehicles frequently pass on road 151 is imaged. This allows displacement amount detector 312 to detect the displacement amount when the displacement is caused on road 151 with passing of the vehicle. Displacement amount detector 312 performs the detection of the displacement amount at the plurality of positions. As a method for detecting the displacement amount at each of the positions, a method similar to the method performed by displacement amount detector 302 described in the first exemplary embodiment can be used.

[6-2. Operation]

[6-2-1. Deflection Detection]

Figure 21:
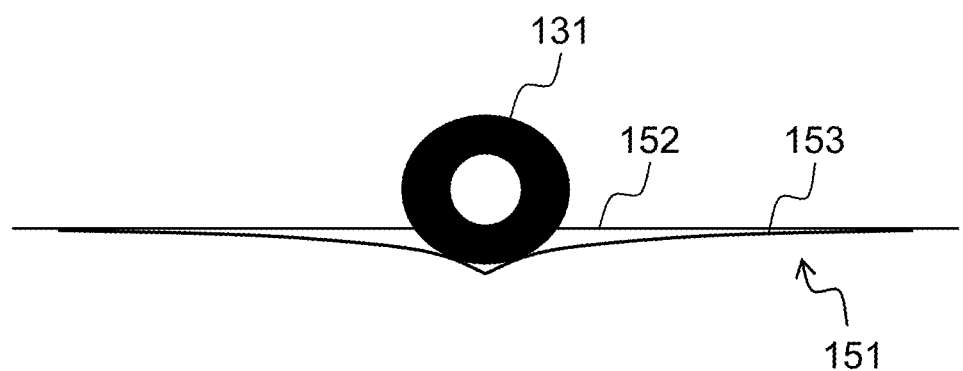
FIG. 21 is a diagram for describing a deflection of a road surface.
Figure 22:
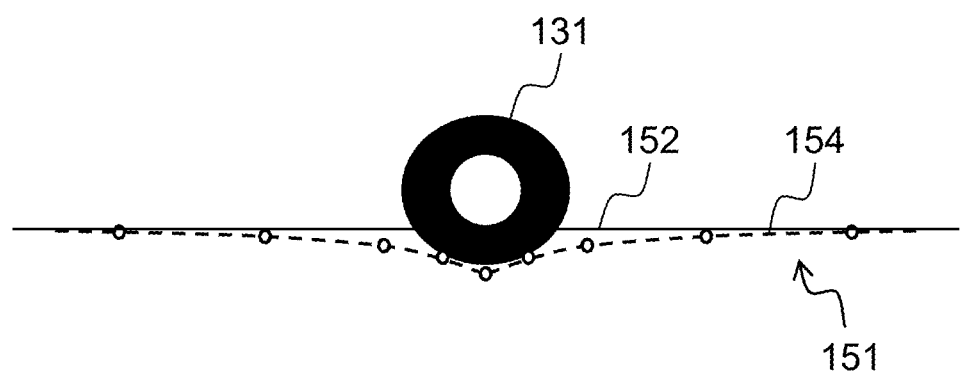
FIG. 22 is a diagram showing one example of a deflection distribution.

FIG. 21 is a diagram for describing a deflection of a road surface. FIG. 22 is a diagram showing one example of the deflection distribution.

Deflection measurer 530 generates the deflection distribution of road 151 from the displacement amounts at the plurality of positions of road 151 detected by displacement amount detector 312. Specifically, when the displacement is caused in road 151 due to the application of an axle weight to road 151, a continuous displacement, that is, a deflection is caused in a certain range on road 151 as shown in FIG. 21.

In FIG. 21, line 152 indicates a surface position of road 151 when no load is applied, and line 153 indicates a surface position of road 151 when a load (axle weight) by wheel 131 of vehicle 130 is applied. As shown in FIG. 21, it can be found that road 151 is deflected toward a center of line 153.

As shown in FIG. 22, road surface 154 is sampled at a plurality of detection points indicated by white circles, and a set of the displacements at the detection points is defined as the deflection distribution. The positions of the detection points of the displacement may be decided beforehand from a distance on road. 151 from wheel 131.

Axle weight extractor 520 outputs the axle weight of vehicle 130 from axle weight table 601 (see FIG. 19) stored in storage 600. Here, when a plurality of the axle weights are registered, they are output to deflection calculator 531 sequentially from the axle weight on a front wheel side. Deflection calculator 531 outputs, to state estimator 410, the generated deflection distribution, and axle weight values of vehicle 130 that causes the deflection distribution sequentially from the front wheel.

State estimator 410 estimates deterioration or fatigue damage of the pavement of road 151 and a position of the deterioration or fatigue damage on a basis of the axle weight of vehicle 130 and the deflection distribution output from deflection measurer 530.

Figure 23:
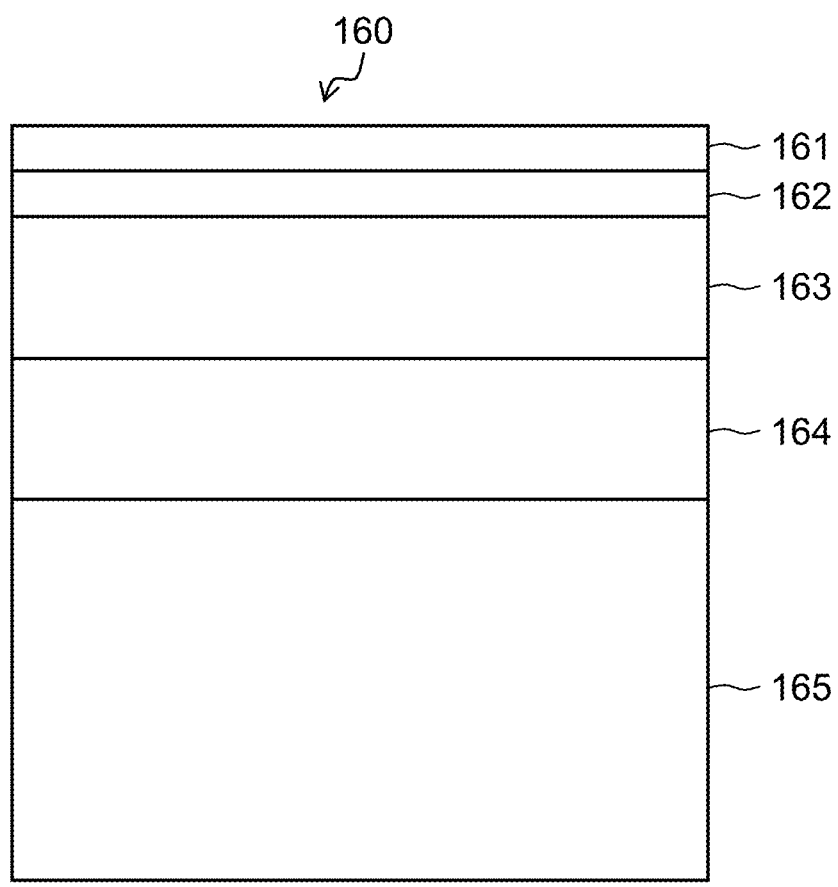
FIG. 23 is a diagram for describing a configuration of a road of asphalt pavement.
Figure 24:
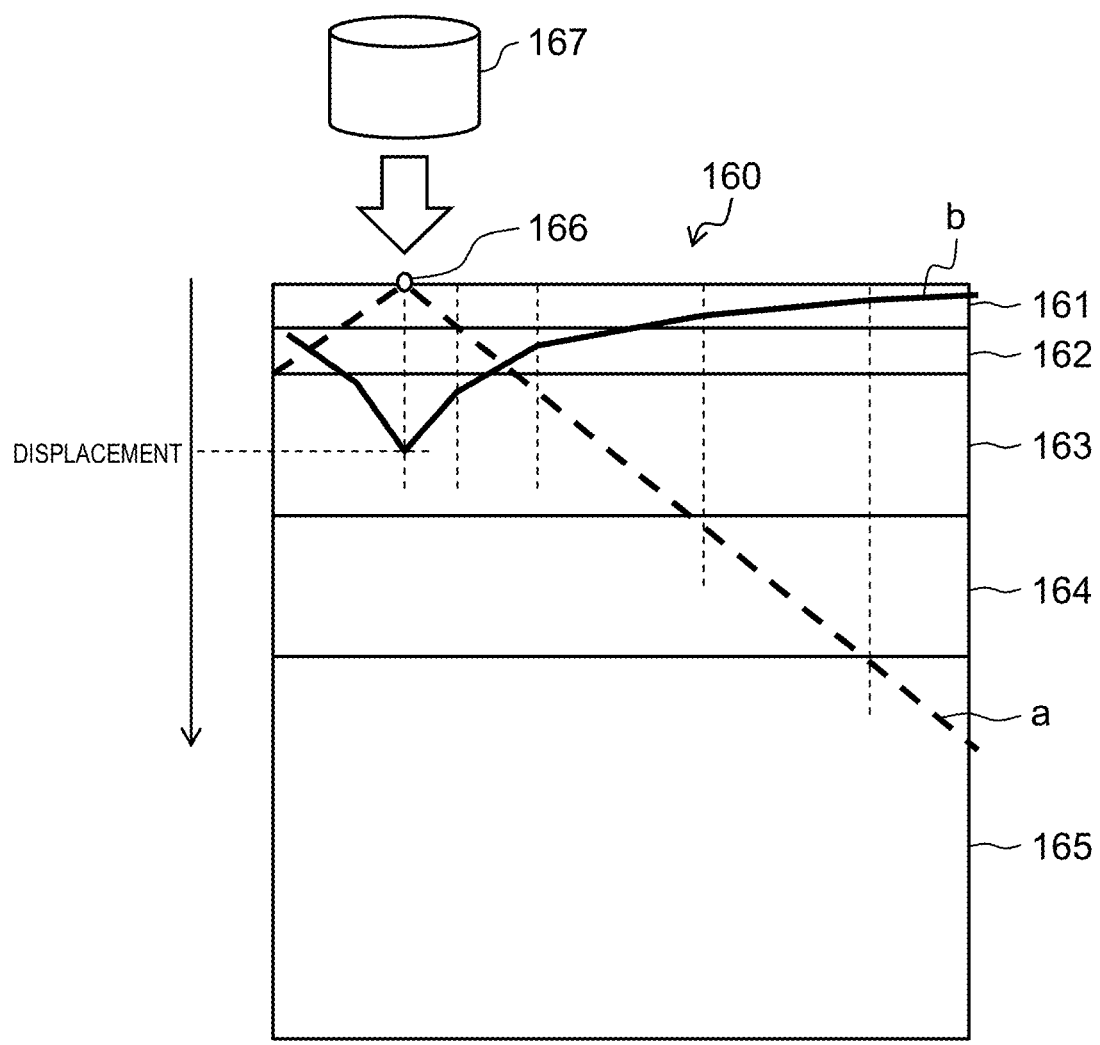
FIG. 24 is a diagram for describing measurement of the deflection distribution.

FIG. 23 is a diagram for describing a configuration of a road of an asphalt pavement. FIG. 24 is a diagram for describing measurement of the deflection distribution.

As shown in FIG. 23, generally, road. 160 of the asphalt pavement is configured of a plurality of layers different in material called front layer 161, base layer 162, upper layer roadbed 163, lower layer roadbed 164, and subgrade 165. For inspection and evaluation of the asphalt pavement made of these plurality of layers, a device called an FWD (Falling Weigh Deflectometer) is utilized. As shown in FIG. 24, this performs the inspection and evaluation of the pavement structure by dropping weight part 167 having a prescribed weight to loading point 166, and measuring the deflection distribution caused in the pavement surface at this time. For example, in the evaluation of the pavement by the FWD, weight part 167 having the prescribed weight is dropped to loading point 166 on road 160. At this time, influence by the load bearing by the drop of weight part 167 appears inside (below) load influence line a. Thereby, by measuring the deflection distribution, a displacement of each of the layers in the pavement structure when a load is applied can be measured. In this manner, deflection distribution b is obtained from magnitudes of the displacements obtained at the prescribed positions to evaluate a deterioration and fatigue damage degree of the pavement structure.

State estimator 410 evaluates the deterioration or fatigue damage degree of the pavement structure by substituting the deflection distribution caused by the load of the axle weight when the vehicle passes for deflection distribution b of the pavement obtained by measuring with this FWD. For example, if a magnitude of a deflection in a portion near the spot directly under the wheel is large, the displacement by the load across the respective layers of the pavement structure is large, so that it can be estimated that the deterioration or the fatigue damage is caused across the respective layers of the pavement structure. Moreover, if the magnitude of the deflection at a spot away from the spot directly under the wheel is abnormally larger than the magnitude of the deflection at the spot directly under the wheel, it can be estimated that the deterioration or the fatigue damage is caused in a deep portion of the pavement structure. Moreover, at this time, the axle weight output from deflection measurer 530, that is, the load that has caused the deflection can also be utilized for evaluation. For example, if there are results and knowledge obtained by past evaluation by the FWD, the deterioration or fatigue damage degree of the pavement structure can be evaluated in terms of comparison with the results and the knowledge. For example, if a load equivalent to the load (weight part) used in the measurement by the FWD is applied as the axle weight, the deflection distribution by the FWD and the deflection distribution by the axle weight may be compared with each other as they are. Moreover, if the load by the axle weight is different from the load in the FWD measurement, the deflection distribution is analyzed in view of a difference between both the loads to evaluate the fatigue damage degree to be evaluated, so that accuracy can be enhanced. A method for evaluating the deterioration or fatigue damage degree used for the deflection distribution is not limited to the foregoing.

[6-3. Effects and the Like]

Monitoring system 6 according to the sixth exemplary embodiment includes axle weight measurer 340, axle weight register 510, axle weight extractor 520, deflection measurer 530, and state estimator 410. Axle weight measurer 340 detects the displacement amount (road surface displacement) of road 150 from the captured image (first captured image) obtained by imaging road 150 when vehicle 130 passes at a predetermined spot of road 150 that vehicle 130 passes, and calculates the axle weight of vehicle 130 from the displacement amount (road surface displacement) and the displacement coefficient. Axle weight register 510 identifies the identification information of the vehicle 130 from the captured image (second captured image) obtained by imaging road 150 when vehicle 130 passes at a predetermined spot of road 150 that vehicle 130 passes, and associates the axle weight and the identification information with each other, and registers the axle weight and the identification information in axle weight table 601. Axle weight extractor 520 identifies the identification information from the captured image (third captured image) obtained by imaging vehicle 130 in road 151 (other road) connected to road 150, and specifies the axle weight corresponding to the identification information from axle weight table 601 to output the specified axle weight. Deflection measurer 530 uses the axle weight output by axle weight extractor 520, and the captured image (fourth captured image) obtained by imaging vehicle 130 in road 151 to measure the deflection of road 151. State estimator 410 uses the deflection measured by deflection measurer 530 to estimate the deterioration degree of road 151.

According to the foregoing, deflection measurer 530 measures the deflection of road 151 subjected to asphalt pavement from the captured image of vehicle 130. State estimator 410 can evaluate the deterioration or fatigue damage degree of the pavement structure, using the deflection measured by deflection measurer 530.

Moreover, in conventional evaluation by the FWD, a dedicated measurement vehicle having an FWD function is simply used, and in this case, the dedicated vehicle need be stopped in a road to perform measurement, so that at the time of measurement, it cannot help performing traffic regulation to the road for the measurement. However, according to monitoring system 6 of the sixth exemplary embodiment, only installing deflection measurer 530, for example, in a road shoulder of road 151 allows the measurement to be performed. This allows the evaluation of the road to be performed without the traffic regulation without occupying the road. Therefore, social loss such as occurrence of a traffic jam due to the traffic regulation can be avoided.

Moreover, axle weight measurer 340 may be installed at an entrance gate such as a tollgate. This allows the axle weight of all vehicles that enter the road to be grasped, and higher-accuracy evaluation of deterioration and fatigue damage to be performed.

The present function may be incorporated in a road monitoring device such as an existing traffic counter. The present function may be carried out in a form of being added to a network of the existing traffic counter.

A description has been given on the assumption that the deflection distribution of the road is a distribution of the plurality of points. However, in some of evaluation purposes or in some evaluation method of the pavement structure, the present disclosure is effective as a configuration of the measurement at only one point.

In the sixth exemplary embodiment, a description has been given on the assumption that imaging devices 200, 201, axle weight measurer 340, and axle weight register 510 are installed on a front side in the traveling direction of vehicle 130 on the road with respect to imaging devices 202, 203, axle weight extractor 520, and deflection measurer 530. However, the present exemplary embodiment is not limited thereto. For example, imaging devices 200, 201, axle weight measurer 340, and axle weight register 510 may be installed on a back side in the traveling direction of vehicle 130 on the road with respect to imaging devices 202, 203, axle weight extractor 520, and deflection measurer 530. In this case, even when axle weight extractor 520 identifies vehicle 130, the information relating to the vehicle number has not existed in axle weight table 601 yet. Therefore, if the information relating to the vehicle number does not exist in axle weight table 601, for example, axle weight extractor 520 may refer to axle weight table 601 periodically at an interval of a certain period. After the information relating to the vehicle number is registered in axle weight table 601, axle weight extractor 520 may specify the axle weight corresponding to the vehicle number, and output the axle weight to state estimator 410.

In the sixth exemplary embodiment, the imaging devices in axle weight measurer 340 and deflection measurer 530 are installed with the directions thereof decided beforehand such that the spots where wheels of vehicles frequently pass on the road are imaged. While each of the imaging devices detects the displacement amount when the displacement is caused on road with passing of the vehicle, the present exemplary embodiment is not limited thereto. For example, as in axle weight measurer 310 of the second exemplary embodiment, the configuration may be such that the imaging device detects a wheel position of the traveling vehicle, and that the displacement of the road is detected in accordance with the position. In this case, the imaging device can evaluate the deterioration or the fatigue damage of the pavement structure from the accurate and stable axle weight value found from the region near the spot directly under the wheel, and the deflection distribution with the region near the loading point as a center and can enhance the accuracy.

Furthermore, the function of calculating the axle weight in view of the number of tires of the wheel as in the third exemplary embodiment may be added to monitoring system 6 of the sixth exemplary embodiment. This can reduce an error that can be caused by a difference in type of the wheel, and the deterioration or the fatigue damage of the pavement structure can be evaluated, so that the accuracy can be enhanced.

Moreover, in a single tire, and a double tire, a pressure applied to the road surface varies, depending on a ground contact area of the wheel. This also changes the road surface displacement amount. From the foregoing, number-of-tire detector 325 detects a range where the tire is grounded or the type of the tire in addition to the number of tires. Axle weight calculator 323 may change a displacement coefficient in accordance with the number of tires, the range where the tire is grounded, or the type of the tire.

In the sixth exemplary embodiment, the configuration has been described in which axle weight measurer 340 obtains the axle weight from the image. However, for example, even when axle weight measurer 340 is replaced by another device such as an axle weight meter or a heavy mat capable of measuring the axle weight, the present disclosure is effective. At this time, an axle weight measurement result by the axle weight meter or the heavy mat, and the identification information of the vehicle may be associated with each other in such a form as table 601.

While in the sixth exemplary embodiment, displacement coefficient α to be used in the axle weight measurement is decided in advance, the present exemplary embodiment is not limited thereto. For example, a method of using the displacement coefficient may be employed, the displacement coefficient being obtained by making matching between the axle weight distribution and the displacement distribution as described in the fourth exemplary embodiment. In this case, automatic update of the displacement coefficient is enabled, so that effects that the operation becomes easy and convenient, and the like can be obtained.

Moreover, the sixth exemplary embodiment includes the configuration to identify vehicle 130 in a case where imaging device 200 is located distant from imaging device 203. As described above, imaging device 200 is associated with axle weight measurer 340 that calculates the axle weight of vehicle 130. Imaging device 203 is associated with deflection measurer 530 that measure the deflection of the road surface due to traveling vehicle 130. However, the present exemplary embodiment is not limited thereto. For example, imaging device 200 may be installed close to imaging device 203. In this case, as long as it is a state where it is assured that a vehicle imaged in imaging device 200, and a vehicle imaged in imaging device 203 are identical, a configuration may be such that imaging device 201 and axle weight register 510, imaging device 202 and axle weight extractor 520, and storage 600 are omitted, and that the axle weight calculated by axle weight calculator 343 is output to deflection calculator 531.

Moreover, a method for specifying the vehicle need not be necessarily limited to the method of using the vehicle number, and further, need not be limited to a method of automatically performing the specification, using axle weight register 510. For example, a worker may specify the vehicle number, the vehicle type, the color and the like visually or by the captured image, and input the information to axle weight extractor 520. Alternatively, a worker may read an output of axle weight calculator 343 with a display device or the like not shown, and may input the axle weight of the vehicle imaged by imaging device 203 to deflection calculator 531. This allows imaging device 201 and axle weight register 510, imaging device 202 and axle weight extractor 520, and storage 600 to be omitted.

Seventh Exemplary Embodiment

While a monitoring system in a seventh exemplary embodiment is also an example of the configuration in which deterioration or fatigue damage of a road pavement is evaluated, using an axle weight of a traveling vehicle and a displacement amount of a road, a way to find the axle weight is different from that of the sixth exemplary embodiment.

[7-1. Configuration]

Figure 25:
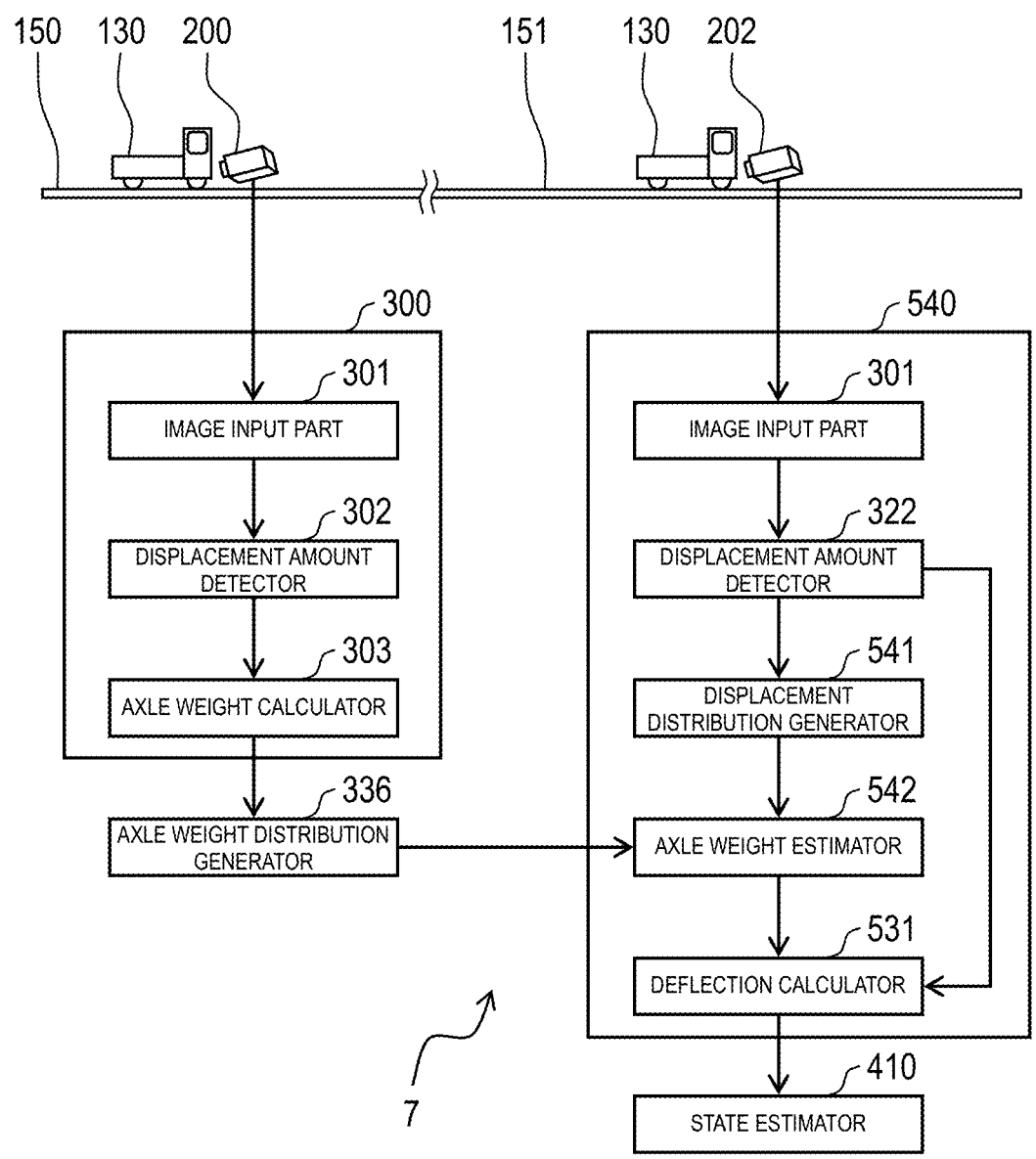
FIG. 25 is a schematic diagram showing a whole configuration of a monitoring system according to a seventh exemplary embodiment.

FIG. 25 is a schematic diagram showing a whole configuration of monitoring system 7 according to the seventh exemplary embodiment. In FIG. 25, components that perform operations similar to those of monitoring systems of the first to sixth exemplary embodiments are given the same reference marks, and description thereof is omitted.

As shown in FIG. 25, monitoring system 7 includes imaging devices 200, 202, axle weight measurer 300, axle weight distribution generator 336, deflection measurer 540, and state estimator 410.

Axle weight measurer 300 measures an axle weight of vehicle 130 from a captured image obtained by imaging device 200 having imaged road 150. Axle weight distribution generator 336 generates an axle weight distribution from the axle weight measured by axle weight measurer 300 by a method similar to that of the fourth exemplary embodiment.

Deflection measurer 540 includes image input part 301, displacement amount detector 322, displacement distribution generator 541, axle weight estimator 542, and deflection calculator 531.

While displacement amount detector 322 basically performs operation similar to that of the sixth exemplary embodiment, a part of a plurality of detected displacements of road 151 are output to displacement distribution generator 541. Displacement distribution generator 541 generates a displacement distribution from the displacement output from displacement amount detector 322, and outputs the displacement distribution to axle weight estimator 542.

Axle weight estimator 542 finds the axle weight of vehicle 130 from the displacement distribution generated by displacement distribution generator 541 and the axle weight distribution output from axle weight distribution generator 336.

Deflection calculator 531 generates a deflection distribution from the displacement output from displacement amount detector 322 and the axle weight output from axle weight estimator 542.

State estimator 410 estimates a state of road 151 from the deflection distribution generated by deflection calculator 531.

[7-2. Operation]

Displacement amount detector 322 of deflection measurer 540 performs operation similar to that of displacement amount detector 312 of the sixth exemplary embodiment, and outputs, for example, one displacement of detected displacements at the plurality of positions to displacement distribution generator 541. While the displacement output to displacement distribution generator 541 is, for example, a displacement detected substantially directly under a wheel, the present exemplary embodiment is not particularly limited thereto. The displacement output to displacement distribution generator 541 may be an average value of the plurality of displacements, or may be, for example, a maximum value or a minimum value of the plurality of displacements.

Displacement distribution generator 541 classifies the displacement output from displacement amount detector 322 by magnitude, and accumulates the displacement. For example, displacement distribution generator 541 classifies a displacement amount supplied from displacement amount detector 322 by bin with a width of 1 bin as 1 pixel, and generates a histogram (displacement distribution).

Axle weight estimator 542 compares the displacement distribution generated by displacement distribution generator 541, and the axle weight distribution generated by axle weight distribution generator 336, and estimates a relationship between the axle weight and the displacement. This method is a method similar to the method described with reference to FIGS. 15 and 16 in the fourth exemplary embodiment. The two distributions are matched to find the corresponding axle weight in accordance with the displacement of the road supplied from displacement amount detector 322. For example, it is assumed that axle weight D1 of the axle weight distribution in FIG. 15 and displacement distribution d1 in FIG. 16 correspond to each other. Thereby, it is assumed that if the displacement amount of road 151 output from displacement amount detector 322 is d1, the axle weight that has caused the displacement is D1. As described above, axle weight estimator 542 finds the axle weight from the displacement amount to output the axle weight to deflection calculator 531.

If there are neither bifurcation nor confluence between a spot where axle weight measurer 300 is installed, and a spot where deflection measurer 540, the displacement distribution and the axle weight distribution substantially match each other. Moreover, even if there is a bifurcation or a confluence, taking the axle weight distributions of a number of vehicles enables traffic characteristics of a surrounding area including the position where deflection measurer 540 is installed to be reflected. Thus, there is no obstacle for finding the axle weight.

According to the above-described configuration, a device for identifying the traveling vehicle in order to obtain the axle weight to be supplied to state estimator 410 becomes unnecessary, so that the system can be configured at a low cost. Moreover, even if the relationship between the axle weight and the displacement has changed due to secular change, the operation of the system is easy and convenient without performing calibration of axle weight measurer 300.

[7-3. Effects and the Like]

As described above, monitoring system 7 according to the seventh exemplary embodiment includes axle weight measurer 300, axle weight distribution generator 336, deflection measurer 540, and state estimator 410. Axle weight measurer 300 detects the displacement amount (road surface displacement) of road 150 from the captured image (first captured image) obtained by imaging road 150 when vehicle 130 passes at a predetermined spot of road 150 that vehicle 130 passes, and calculates the axle weight of vehicle 130 from the displacement amount and the displacement coefficient. Axle weight distribution generator 336 generates the axle weight distribution from the axle weight calculated by axle weight measurer 300. Deflection measurer 540 detects the displacement amount of road 151 from the captured image (second captured image) obtained by imaging vehicle 130 in road 151 (other road) connected to road 150 to generate the displacement distribution, and measures the deflection of road 151, using the axle weight distribution and the displacement distribution to generate the deflection distribution. State estimator 410 uses the deflection distribution generated by deflection measurer 540 to estimate the deterioration degree of road 151.

Thereby, a device for identifying the traveling vehicle in order to obtain an axle weight value output to state estimator 410 becomes unnecessary. Accordingly, the system can be configured at a low cost.

In the seventh exemplary embodiment, for example, as in axle weight measurer 310 of the second exemplary embodiment, the configuration may be such that a wheel position of the traveling vehicle is detected, and that the displacement of the road is detected in accordance with the position. In this case, the stable displacement found from a region near the spot directly under the wheel can be accurately obtained. Furthermore, the function of calculating the axle weight in view of the number of tires of the wheel as in the third exemplary embodiment may be added. In this case, the accuracy of the calculated axle weight can be more enhanced.

Moreover, in the seventh exemplary embodiment, a description has been given on the assumption that imaging device 200, axle weight measurer 300, and axle weight distribution generator 336 are installed on a front side in the traveling direction of vehicle 130 on the road with respect to imaging device 202 and deflection measurer 540. However, the present exemplary embodiment is not limited thereto, the present exemplary embodiment is effective even if a positional relationship on the road is reverse.

Eighth Exemplary Embodiment

While monitoring system 8 in an eighth exemplary embodiment is also an example of the configuration in which deterioration or fatigue damage of a road pavement is evaluated, using an axle weight of a traveling vehicle and a displacement amount of a road, the vehicle as means that applies a load to the road is different from that of the sixth exemplary embodiment.

Hereafter, details of the foregoing will be described with reference to the drawings, focusing on differences from monitoring system 6 in the sixth exemplary embodiment. The same components as those of the sixth exemplary embodiment are given the same reference marks, and description thereof is omitted.

[8-1. Configuration]

Figure 26:
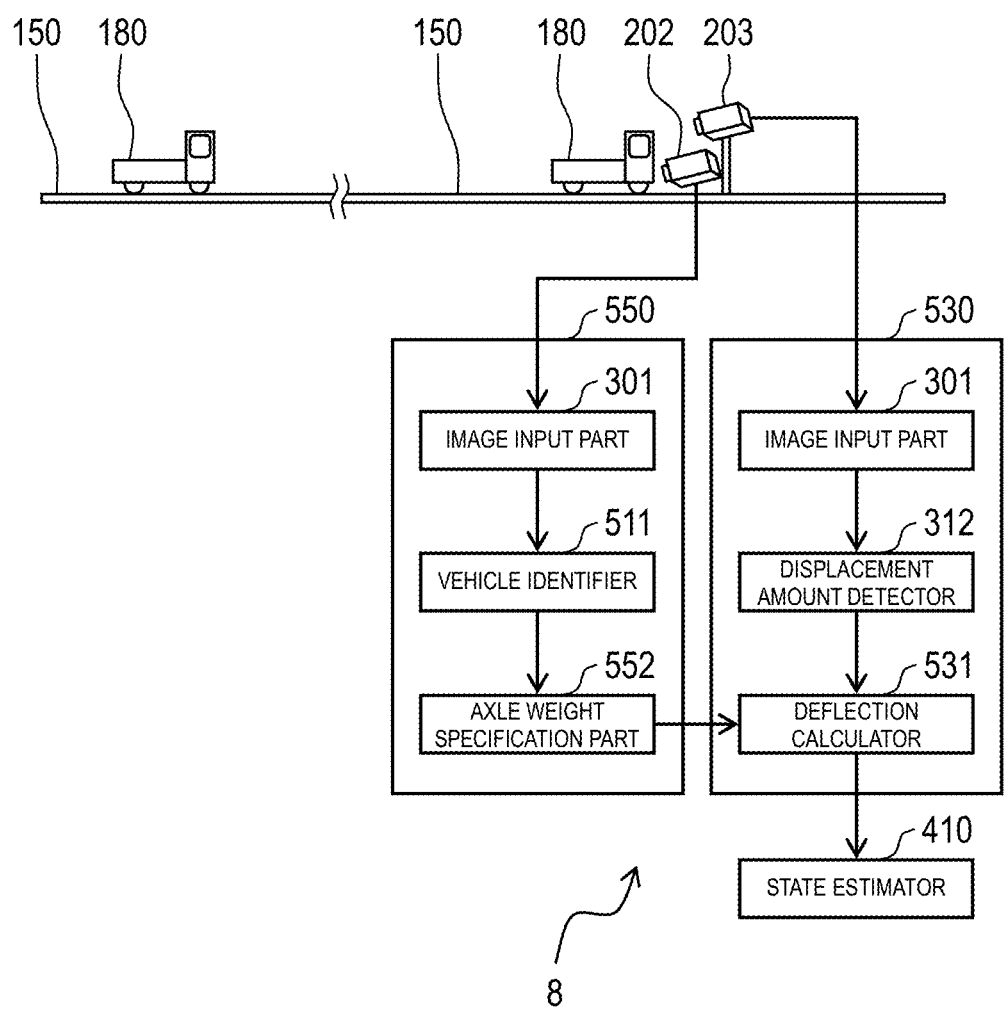
FIG. 26 is a schematic diagram showing a whole configuration of a monitoring system according to an eighth exemplary embodiment.

FIG. 26 is a schematic diagram showing a whole configuration of monitoring system 8 according to the eighth exemplary embodiment.

Monitoring system 8 is configured of imaging devices 202, 203, axle weight extractor 550, deflection measurer 530, and state estimator 410. In FIG. 26, components that perform operations similar to those in the first to seventh exemplary embodiments are given the same reference marks and description thereof is omitted.

Vehicle 180 is a vehicle for test on which a weight part is beforehand mounted or the like such that an axle weight becomes a prescribed value.

While axle weight extractor 550 has a function analogous to that of axle weight extractor 520 described in the sixth exemplary embodiment, axle weight extractor 550 is different only in that the axle weight is found from an axle weight table stored beforehand (not shown).

Figures 27, 28:
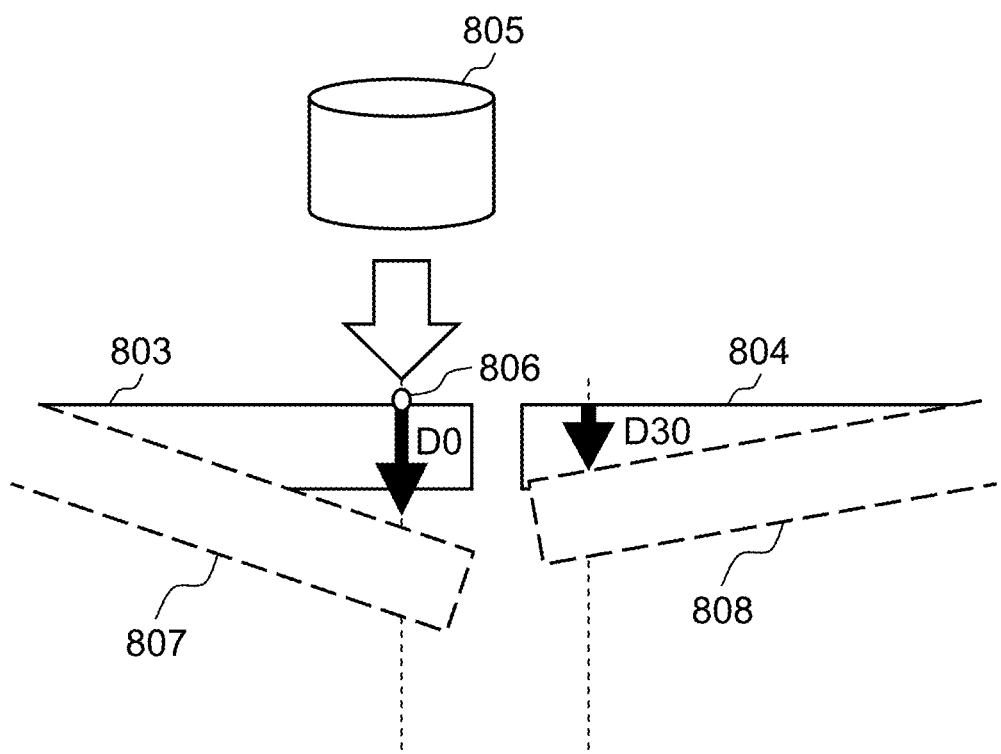
FIG. 27 is a diagram showing one example of an axle weight table stored by an axle weight extractor.
FIG. 28 is a diagram for describing deterioration of a concrete pavement path.

FIG. 27 is one example of the axle weight table stored by axle weight extractor 550. In axle weight table 602 in FIG. 27, the axle weights of two vehicles 180 are registered. That is, axle weight table 602 shows cases in each of which two-axle wheels are used, and front and rear axle weights are the same.

[8-2. Operation]

In monitoring system 8 configured as described above, two vehicles 180 are caused to travel in road 150.

When each of vehicles 180 comes to a spot where a deflection of road 150 is measured, imaging devices 202, 203 image vehicle 180.

As in the sixth exemplary embodiment, axle weight extractor 550 identifies a number plate of vehicle 180 from a captured image obtained by imaging device 202 having imaged vehicle 180, and detects the vehicle number from the number plate. Axle weight specification part 552 of axle weight extractor 550 extracts the axle weight of vehicle 180 from axle weight table 602 to output the axle weight to deflection measurer 530.

Subsequent operation is similar to that of the sixth exemplary embodiment, and a deflection distribution and an axle weight are output from deflection measurer 530 to state estimator 410, and deterioration or fatigue damage of a pavement structure of road 151 is evaluated, but detailed description thereof is omitted.

[8-3. Effects and the Like]

As described above, according to the eighth exemplary embodiment, using vehicle 180 having the identification information and the axle weight registered in the axle weight table beforehand, the deflection of road 150 is measured to estimate a state of road 150.

This makes unnecessary a device for obtaining the axle weight value of the traveling vehicle, and a device for identifying the traveling vehicle by a plurality of imaging devices, so that the system can be configured at a low cost.

While in the eighth exemplary embodiment, the example in which two vehicles 180 are caused to travel has been described, the present disclosure is not limited thereto, and the number of vehicles 180 may be one or plural. Preparing a plurality of vehicles 180 has an advantage of conducting the evaluation of the deflection in various conditions with the axle weight varied.

Moreover, in the eighth exemplary embodiment, for example, as in axle weight measurer 310 of the second exemplary embodiment, the configuration may be such that a wheel position of the traveling vehicle is detected, and that the displacement of the road is detected in accordance with the position. In this case, the displacement found from a region near a spot directly under the wheel can be obtained accurately and stably. Furthermore, a function of reflecting an influence of the load by the axle weight in view of the number of tires of the wheel as in the third exemplary embodiment may be added. In this case, estimation accuracy of state estimator 410 can be more enhanced.

Moreover, a method for specifying the vehicle need not be necessarily limited to the method of using the vehicle number, and further, need not be limited to a method of automatically performing the specification, using axle weight extractor 550. For example, a worker may specify vehicle 180 visually or by the captured image, and input the axle weight of the vehicle imaged by imaging device 203 to deflection calculator 531. This can allows imaging device 202 and axle weight extractor 550 to be omitted.

Other Exemplary Embodiments

As described above, the exemplary embodiments have been described as illustrations of the technique disclosed in the present application. However, the technique in the present disclosure is not limited to those, and can be also applied to exemplary embodiments in which modifications, replacements, additions, omissions, or the like are made as appropriate.

In each of the exemplary embodiments, a description has been given on the assumption that the axle weight measurer is an example of the configuration in which the tire of the vehicle on the road is recognized by the image processing, and a region on the road corresponding to a lowest point of the tire is specified as an axle weight position. However, a method for specifying the axle weight position need not be necessarily limited to the above-described method. For example, a position where the displacement amount locally becomes maximum may be specified as the axle weight position.

While in the sixth to eighth exemplary embodiments, the asphalt pavement has been described as an example, the present disclosure is not limited thereto. The present disclosure can be applied to a concrete pavement or another pavement, as long as it is a pavement, or a surface structure whose deterioration or fatigue damage can be evaluated on a basis of the displacement or the deflection of a road surface.

Moreover, for the concrete pavement, there is a technique of measuring a load transmission rate between continuous concrete plates to evaluate deterioration or fatigue damage. FIG. 28 shows that concrete plates 803, 804 of a continuous concrete pavement path have sunk to positions of concrete plates 807, 808 by weight part 805 dropped to loading point 806 for evaluation. D0, D30 denote subsidence amounts of concrete plates 803, 804 after weight part 805 is dropped, respectively. At this time, load transmission rate Eff is calculated by the following expression, and as this Eff is lower, it is evaluated that the deterioration of the concrete pavement has progressed more.

$$Eff = 2 \times D30/(D0+D30)$$

In this manner, besides the deflection distribution, the technique for evaluating the concrete pavement exists. The present disclosure is effective even when the configuration is such that in the deflection measurer described in the sixth to eighth exemplary embodiments, D0 and D30 are found from the image obtained by imaging the road, and Eff is calculated to evaluate the deterioration of the concrete plates.

In the present disclosure, the captured image may be a monochrome image, a color image, or a multispectral image. Moreover, light for imaging may be a ultraviolet ray, a near infrared ray, or a far infrared ray as well as visible light.

In the present disclosure, in order to capture a clear captured image, a lighting device that irradiates the region to be imaged by the imaging device may be installed. The irradiation from the lighting device may be synchronized with imaging timing of the imaging device. Moreover, a temperature sensor that measures a road surface temperature of the road or an atmospheric temperature near the road may be installed separately to correct the axle weight or the deflection amount in view of the road surface temperature and the atmospheric temperature.

In each of the exemplary embodiments, some or all functions other than the imaging device may be configured of one or a plurality of devices, a cloud server, or the like. Moreover, the functions may be implemented by being connected to a network of an existing traffic counter. Moreover, the devices or the like need not be individually installed around the road.

The axle weight measurer in the present disclosure may be substituted with another meter capable of measuring the axle weight such as an axle weight meter or a heavy mat.

Moreover, the imaging device in the present disclosure may sense approaching of the vehicle with a sensor or the like, and image the vehicle only when the vehicle approaches.

Moreover, in the case of a bridge, a deflection of the whole bridge may be observed, and deterioration of the bridge may be estimated from the axle weight of the vehicle measured by the present system, or a relationship between positional information and the deflection of the vehicle detected when the whole bridge is observed.

Moreover, when the axle weight of the vehicle is calculated, if the axle weight exceeds an upper limit defined by a law, the vehicle can be regarded as an overloaded vehicle. From this, it may be determined whether or not the vehicle is in an overloaded state on a basis of a calculation result of the axle weight, and the foregoing fact may be displayed through a display device installed in the road or the like, or may be reported to a road administrator. Thereby, the present disclosure can be utilized for suppression or regulation of an illegal overloaded vehicle.

Moreover, a configuration can also be considered in which the axle weight of the traveling vehicle is calculated, and on a basis of the axle weight, a traveling route of the vehicle is navigated, using a mechanism of an ETC or an ITS. In this case, for example, if secular change of a structure has progressed, and a route where passing of a heavy vehicle is desired to be restricted as much as possible exists, a route where the foregoing route is avoided as much as possible can also be instructed to a driver.

Moreover, when deterioration or the like of a structure is determined, the axle weights obtained from all traveling vehicles or the deflection of the road surface may be utilized, or the axle weights obtained from a part of vehicles, or the deflection of the road surface may be utilized. For example, since in a vehicle having a light axle weight such as a light vehicle, the influence on the deterioration of the structure is slight or negligible, a configuration can also be such that the axle weight and the deflection obtained from the vehicle having the light axle weight are not used for evaluation. This can decrease a processing amount of the system, or traffic of a communication path for communicating information, so that there are advantages that the system can be configured at a low cost, and that a power consumption can be decreased.

Moreover, in the monitoring of the structure, for example, vibration of an object may be measured by a physical sensor such as an acceleration sensor, or a stress applied to an object and a distribution of the stress may be measured by an infrared camera. In this manner, when the structure is monitored by the acceleration sensor or by the infrared camera, by adding the function of calculating the axle weight of the vehicle of the present disclosure, the axle weight applied to the structure, and the vibration or the stress caused by this can be associated with each other for observation, so that monitoring accuracy of the structure can obviously be expected to be enhanced. For example, in the case where the structure is a bridge, if the axle weight and a vehicle weight of the traveling vehicle applied to the bridge, the vibration of the bridge at this time, and the stress applied to the bridge can be measured substantially simultaneously, a relationship among the load, the vibration, and the stress applied to the bridge can be determined quantitatively. Thus, the present disclosure is effective to a state grasping and estimation of the deterioration of the bridge.

Moreover, as means for measuring the axle weight of the vehicle passing on the bridge, there is a system called BWIM (Bridge Weigh in Motion). This is to measure an axle weight and a load applied to a bridge from a vehicle traveling on the bridge by installing a strain gauge and an acceleration sensor, and analyzing outputs thereof. In this BWIM, a test vehicle whose vehicle weight and axle weight is known is beforehand caused to travel on the bridge, and the outputs of the strain gauge and the acceleration sensor are observed at this time to perform calibration of the detected axle weight and load. In the bridge where this BWIM is installed, the axle weight measurer described in the first to fifth exemplary embodiments is installed in the road connected to the bridge to measure the axle weight of the passing vehicle while identifying the relevant vehicle, and to utilize the passing on the bridge of the identified vehicle for the calibration of the BWIM. Thereby, without using the test vehicle whose axle weight is known, a relationship between the axle weight, and the outputs of the strain gauge and the acceleration sensor can be known, using the general vehicle passing on the bridge. This enables the calibration of the BWIM to be performed. The present disclosure is effective to the above-described utilization.

Moreover, in the first to fifth exemplary embodiments, the axle weight is calculated based on the displacement of the pavement surface of the road. However, the axle weight may be calculated based on, for example, a displacement of an elastic sheet-shaped or plate-shaped structure. The elastic structure is layered on the road at a position where the axle weight is measured. The displacement of the elastic structure is caused when the vehicle travels on the elastic structure. For this structure, various forms, for example, a rubber-like sheet and a plate-shaped structure made of carbon, metal, or concrete supported by a spring or a damper can be considered. Moreover, In the case where the above-described structure is installed, for example, forming a random pattern to a traveling surface of the structure enables the displacement to be observed more accurately when the displacement of the structure is observed from the captured image. This pattern may not be random, and any pattern is effective, as long as the pattern is preferable for detecting a difference between images by the image processing such as block matching. Even if the sheet-shaped or plate-shaped structure is not newly installed in the road, for example, a configuration may be employed in which, for example, a displacement of a loading plate of an existing axle weight meter or a linear weight sensor is observed. In this case, for example, if the axle weight meter is disabled to be used due to breakdown, large-scale construction work is required for repairing or replacement, and in addition, the measurement of the axle weight is disabled during the construction work. However, by observing the displacement of the loading plate to measure the axle weight by the technique of the present disclosure, substitute of the axle weight meter is easily enabled. If it is not the case, the displacement of the loading plate of the axle weight meter or the linear weight sensor has been measured, and the axle weight found from the displacement, and a measurement result of the axle weight meter are compared to observe change in a correspondence relationship thereof, whereby, for example, if in spite of the same displacement, the axle weight measured by the axle weight meter is changed, it can be determined that the axle weight meter needs recalibration or repairing due to secular change, deterioration, or breakdown. Moreover, if the above-described information is presented to an administrator through display or transmission means such as alarm display, a buzzer, or wireless communication, the administrator can perform recalibration, repairing, or replacement of the axle weight meter at an appropriate time.

In each of the exemplary embodiments, the components (function blocks) in the monitoring system may be implemented individually as single chips, or a single chip may incorporate some or all of the components, by means of a semiconductor device such as an integrated circuit (IC) or large scale integration (LSI). Moreover, a technique for circuit integration is not limited to the LSI, and may be implemented by a dedicated circuit or a general-purpose processor. A field programmable gate array (FPGA), for which programming is possible after LSI fabrication, or a reconfigurable processor capable of reconfiguring connections and settings of circuit cells inside an LSI may also be utilized. Further, if a technique for circuit integration that replaces the LSI as a result of the development of semiconductor technique or another technique derived from the semiconductor technique has advanced, the function blocks may be integrated by using that technique. Application of biotechnology or the like may be possible.

Further, all of or a part of various processing described above may be implemented by hardware such as an electronic circuit, or may be implemented by using software. It is to be noted that the processing using software is implemented in such a way that a processor included in the monitoring system executes the program stored in the memory. Furthermore, the program may be recorded on a recording medium and may be distributed or circulated. For example, the distributed program is installed in another device including a processor, and the program is executed by the processor. In this way, the device can execute the above-described processing.

In addition, exemplary embodiments implemented by any combination of the components and the functions of the above-described exemplary embodiments are included in the scope of the present disclosure.

INDUSTRIAL APPLICABILITY

The present disclosure can be utilized for a monitoring system that monitors a state of a structure.

REFERENCE MARKS IN THE DRAWINGS 1, 4, 5, 6, 7, 8: monitoring system
101, 121, 150, 151: road
102: bridge (structure)
130, 180: vehicle
140: composition
200, 201, 202, 203: imaging device
300, 310, 320, 330, 340: axle weight measurer
301: image input part
302, 312, 322: displacement amount detector
303, 323, 333, 343: axle weight calculator
314: load position detector
325: number-of-tire detector
336: axle weight distribution generator
400, 410: state estimator
401: axle weight integrator
402: state analyzer
500: axle weight meter
510: axle weight register
511: vehicle identifier
512: information register
520, 550: axle weight extractor
521, 522, 552: axle weight specification part
530, 540: deflection measurer
531: deflection calculator
600: storage

The invention claimed is:

1. A monitoring system comprising:
an axle weight measurer that detects a surface displacement of a road from a first captured image obtained by imaging the road when a vehicle passes at a predetermined spot of a structure having the road that the vehicle passes, and calculates an axle weight of the vehicle from the surface displacement and a displacement coefficient of the road, wherein the axel weight measurer detects surface displacements for a plurality of vehicles and calculates axle weights for the plurality of vehicles, respectively; and
a state estimator that generates an axle weight histogram from the axle weights calculated by the axle weight measurer, and estimates a deterioration degree of the structure, using the axle weight histogram.

2. The monitoring system according to claim 1, wherein the state estimator determines necessity of repairing of the structure and a repairing time of the repairing from the deterioration degree.

3. The monitoring system according to claim 1, wherein the axle weight measurer detects a wheel of the vehicle, and detects the surface displacement from an image of a region close to the wheel in the road inside the first captured image.

4. The monitoring system according to claim 1, wherein the axle weight measurer includes a number-of-tire detector that detects a number of tires per wheel of the vehicle, and calculates the axle weight in accordance with the number of tires.

5. The monitoring system according to claim 1, wherein the axle weight measurer accumulates axle weights measured by an axle weight meter disposed in another road connected to the road to generate another axle weight histogram, accumulates surface displacements to generate a displacement histogram, and calculates the displacement coefficient, using the another axle weight histogram and the displacement histogram.

6. A monitoring system comprising:
an axle weight measurer that detects a surface displacement of a road from a first captured image obtained by imaging the road when each of a plurality of vehicles passes at a predetermined spot of the road, and calculates an axle weight of the each of the plurality of vehicles from the surface displacement and a displacement coefficient of the road;
an axle weight register that identifies identification information of the each of the plurality of vehicles from a second captured image obtained by imaging the road when the each of the plurality of vehicles passes at the predetermined spot, associates the axle weight and the identification information with each other, and registers the axle weight and the identification information in an axle weight table;

an axle weight extractor that identifies the identification information from a third captured image obtained by imaging vehicles in another road connected to the road, and extracts axle weights of matched vehicles corresponding to the identification information from the axle weight table; and a state estimator that generates an axle weight histogram from the axle weights of the matched vehicles of the another road, and estimates a deterioration degree of a structure having the another road, using the axle weight histogram.

7. A monitoring system comprising:

an axle weight measurer that detects a surface displacement of a road from a first captured image obtained by imaging the road when a vehicle passes at a predetermined spot of the road that the vehicle passes, and calculates an axle weight of the vehicle from the surface displacement and a displacement coefficient, wherein the axel weight measurer detects surface displacements for a plurality of vehicles and calculates axle weights for the plurality of vehicles, respectively;

an axle weight histogram generator that generates an axle weight histogram from the axle weights calculated by the axle weight measurer;

a deflection measurer that detects a surface displacement of another road from a second captured image obtained by imaging the vehicle in the another road connected to the road, wherein the deflection measurer detects surface displacements of the another road for the plurality of vehicles, generates a displacement histogram from the surface displacements, and generates a deflection distribution of the another road using the axle weight histogram and the displacement histogram; and a state estimator that estimates a deterioration degree of the another road, using the deflection distribution generated by the deflection measurer.

* * * * *